US008907939B2

(12) United States Patent
Liu et al.

(10) Patent No.: US 8,907,939 B2
(45) Date of Patent: Dec. 9, 2014

(54) FRAME MAINTAINING CIRCUIT AND FRAME MAINTAINING METHOD

(75) Inventors: Yueh-Hsiu Liu, Hsinchu (TW); Hsin-Yih Li, Taipei County (TW); Chih-Yung Hsu, Hsinchu County (TW); Yu-Shao Liu, Kaohsiung (TW); Chih-Jen Yen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 174 days.

(21) Appl. No.: 13/492,328

(22) Filed: Jun. 8, 2012

(65) Prior Publication Data

US 2012/0242644 A1 Sep. 27, 2012

Related U.S. Application Data

(63) Continuation-in-part of application No. 13/064,436, filed on Mar. 24, 2011, now abandoned, and a continuation-in-part of application No. 13/366,366, filed on Feb. 6, 2012.

(51) Int. Cl.

| | |
|---|---|
| ***G06F 3/038*** | (2013.01) |
| ***G09G 5/00*** | (2006.01) |
| ***G09G 3/20*** | (2006.01) |
| *G09G 3/34* | (2006.01) |
| *G09G 3/36* | (2006.01) |

(52) U.S. Cl.

CPC ............ *G09G 3/2096* (2013.01); *G09G 3/3406* (2013.01); *G09G 2330/12* (2013.01); *G09G 2330/06* (2013.01); *G09G 2310/0267* (2013.01); *G09G 5/008* (2013.01); *G09G 3/20* (2013.01); *G09G 3/3677* (2013.01); *G09G 3/3688* (2013.01)

USPC ............................................ 345/212; 345/204

(58) Field of Classification Search

USPC ........... 345/87–103, 204, 690–693, 211–214; 361/56

See application file for complete search history.

(56) References Cited

U.S. PATENT DOCUMENTS

| | | | | |
|---|---|---|---|---|
| 7,812,833 | B2 | 10/2010 | Kim et al. | |
| 7,893,912 | B2 | 2/2011 | Kim | |
| 8,040,939 | B2 | 10/2011 | Kim et al. | |
| 2003/0062957 | A1 | 4/2003 | Terashima et al. | |
| 2003/0226082 | A1 * | 12/2003 | Kim et al. | 714/734 |
| 2004/0100435 | A1 | 5/2004 | Baek et al. | |
| 2006/0050027 | A1 | 3/2006 | Meguro et al. | |
| 2007/0126686 | A1 | 6/2007 | Chang et al. | |
| 2007/0247183 | A1 * | 10/2007 | Chang et al. | 326/26 |
| 2008/0211790 | A1 | 9/2008 | Jung et al. | |
| 2008/0218232 | A1 | 9/2008 | Jeon | |
| 2009/0287435 | A1 * | 11/2009 | Ker et al. | 702/64 |
| 2010/0033453 | A1 | 2/2010 | Park et al. | |
| 2012/0063045 | A1 * | 3/2012 | Shearon | 361/65 |

FOREIGN PATENT DOCUMENTS

| | | | |
|---|---|---|---|
| CN | 1975523 | A | 6/2007 |

* cited by examiner

*Primary Examiner* — Hong Zhou
(74) *Attorney, Agent, or Firm* — Rabin & Berdo, P.C.

(57) ABSTRACT

A frame maintaining circuit including a detection circuit and a display control circuit is provided. The detection circuit detects an unusual status to output a status feedback signal. The display control circuit maintains a frame displayed by a display apparatus according to the status feedback signal until the unusual status ceases.

14 Claims, 32 Drawing Sheets

FRAME MAINTAINING CIRCUIT AND FRAME MAINTAINING METHOD

This is a continuation-in-part application of U.S. application Ser. No. 13/064,436, filed Mar. 24, 2011, and U.S. application Ser. No. 13/366,366, filed Feb. 6, 2012. The contents of which are incorporated herein by reference.

BACKGROUND OF THE INVENTION

1. Field of the Invention

The invention relates in general to a frame maintaining circuit and a frame maintaining method, and more particularly to a frame maintaining circuit and a frame maintaining method for preventing an erroneously frame from being displayed.

2. Description of the Related Art

FIG. 1 shows a schematic diagram of a conventional display apparatus; FIG. 2 shows a signal timing diagram of a conventional display apparatus. A conventional display apparatus 1 includes a panel 11, a scan driver 14, a data driver 15 and a timing controller 16. The scan driver 14 includes a plurality of scan driving integrated circuits 142. The data driver 15 includes a plurality of data driving integrated circuits 154. The timing controller 16 outputs clock signals CLK and YCLK, an output enabling signal YOE (or referred to as a gate control signal), a data signal DATA and a data loading signal LD (or referred to as a source control signal). The timing controller 16 further controls the scan driving integrated circuits 142 to output a plurality of scan signals G(1) to G(N), and controls the data driving integrated circuits 154 to output a data signal DATA.

However, an unusual status such as electrostatic discharge (ESD) and power noise may easily cause data error to the data driver 15. In addition, the unusual status may also cause the scan driver 34 to output erroneous scan signals. For example, when an unusual status 20 occurs in the data signal DATA of data driver 15 in a data period T4, the data loading signal LD controls the data driver 15 to load the data signal DATA affected by the unusual status 20 to the data lines of the panel 31 in a loading period T5. Since the corresponding scan signal G(2) is transformed into an enabling level, an erroneous frame is then displayed on the panel 11.

SUMMARY OF THE INVENTION

The invention is directed to a frame maintaining circuit and a frame maintaining method.

According to an aspect the present invention, a frame maintaining circuit for a display apparatus is provided. The frame maintaining circuit includes a detection circuit and a display control circuit. The detection circuit detects an unusual status to output a status feedback signal. The display control circuit maintains a frame displayed by the display apparatus according to the status feedback signal until the unusual status ceases.

According to another aspect of the present invention, a frame maintaining method for a display apparatus is provided. The frame maintaining method includes steps of detecting an unusual status to output a status feedback signal, and maintaining a frame displayed by the display apparatus according to the status feedback signal until the unusual status ceases.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
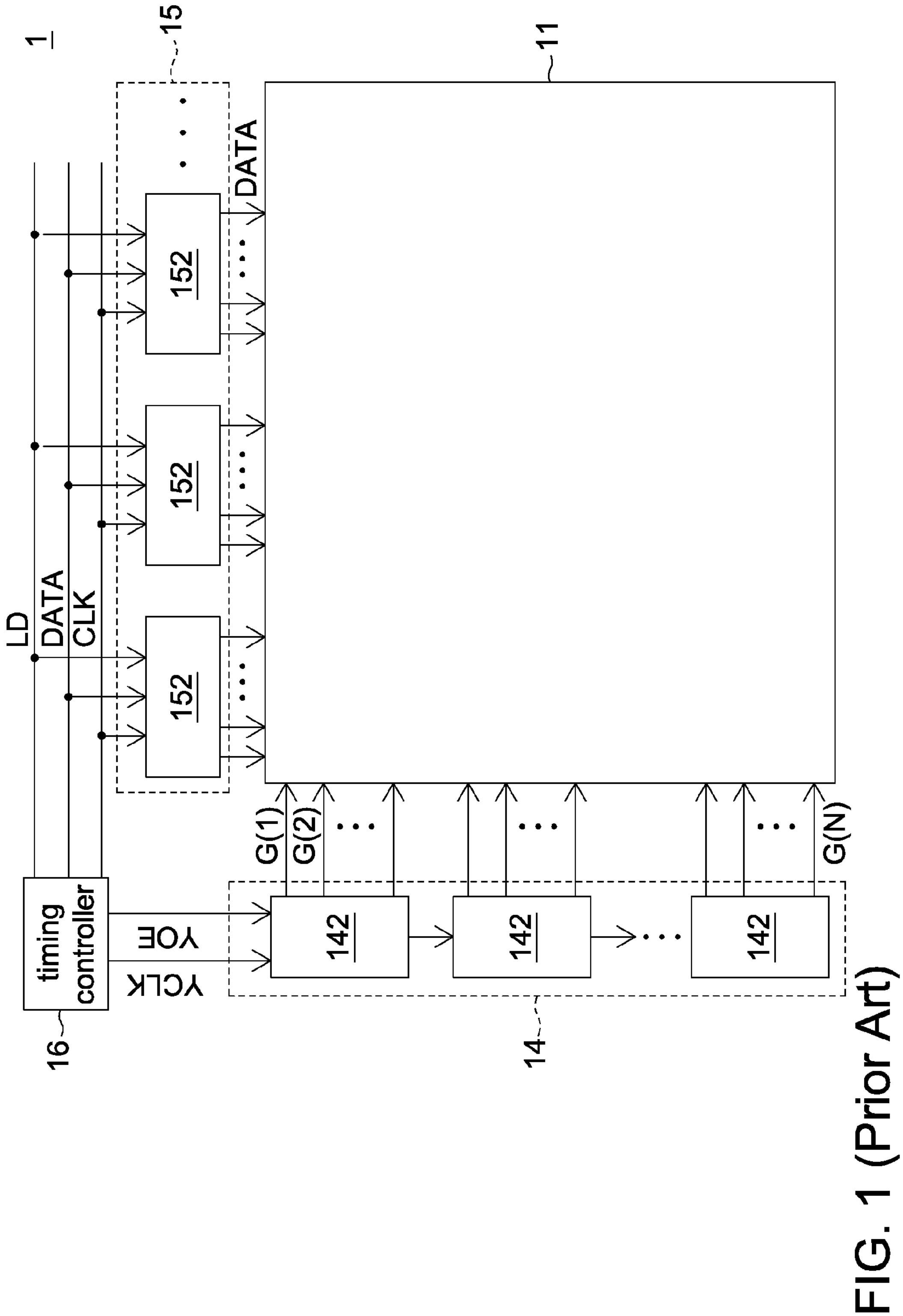
FIG. 1 (Prior Art)
FIG. 1 is a schematic diagram of a conventional display apparatus.
Figure 2:
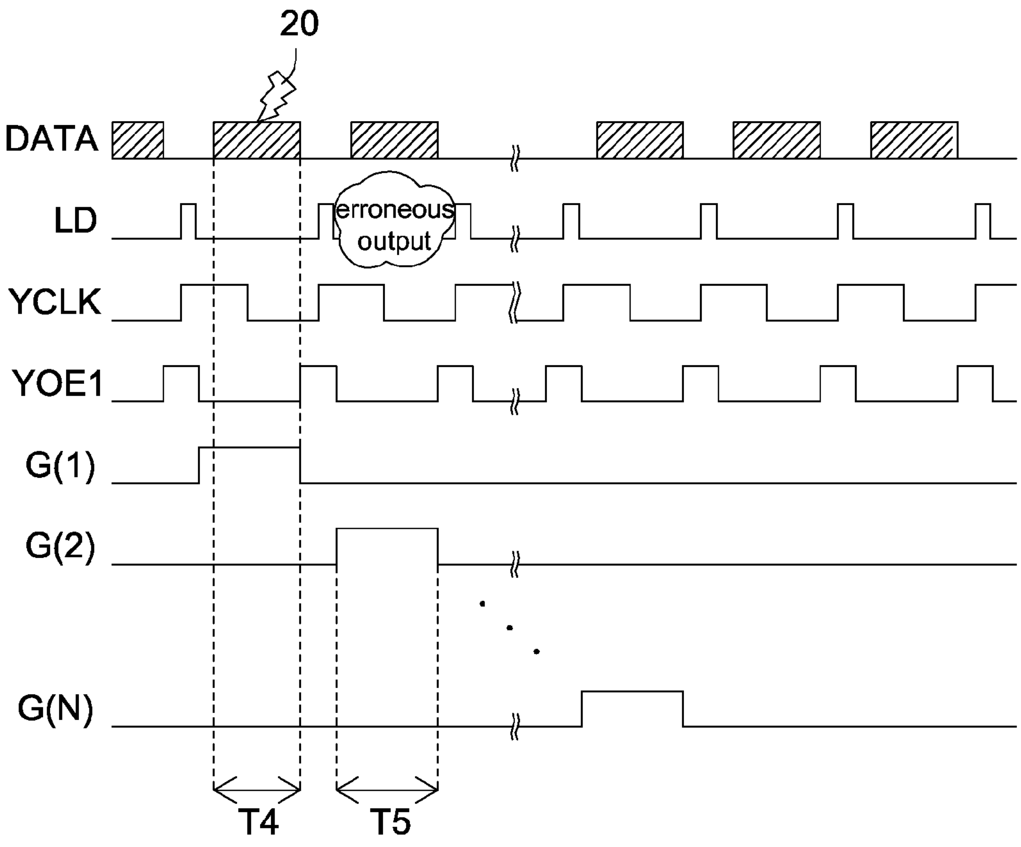
FIG. 2 (Prior Art)
FIG. 2 is a signal timing diagram of a conventional display apparatus.
Figure 3:
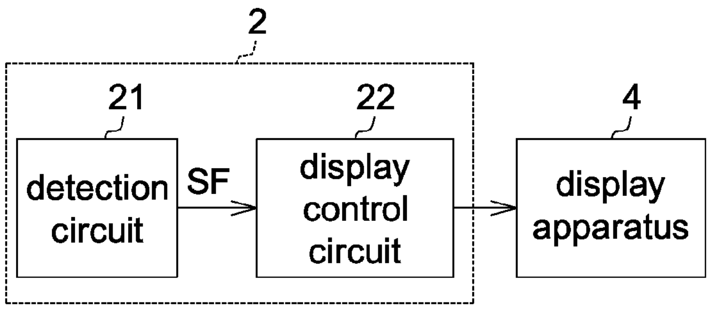
FIG. 3 is a schematic diagram of a frame maintaining circuit applied to a display apparatus.

FIG. 3 shows a schematic diagram of a frame maintaining circuit for a display apparatus according to one embodiment. A frame maintaining circuit 2, for maintaining a frame displayed by a display apparatus 4, includes a detection circuit 21 and a display control circuit 22. The detection circuit 22 detects an unusual status to output a status feedback signal SF. According to the status feedback signal SF, the display control circuit 22 maintains the frame displayed by the display apparatus 4 until the unusual status ceases.

First Embodiment

Figure 4:
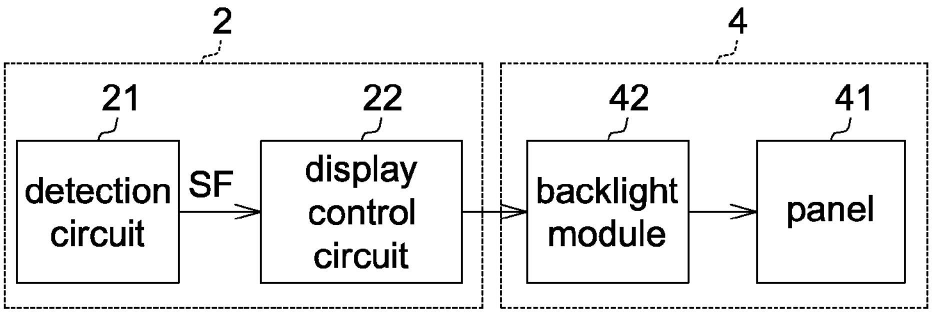
FIG. 4 is a schematic diagram of a frame maintaining circuit controlling a backlight module.

FIG. 4 shows a schematic diagram of a frame maintaining circuit controlling a backlight module. A display apparatus 4 includes a panel 41 and a backlight module 42. According to the status feedback signal SF, the display control circuit 22 controls a backlight brightness of the backlight module 42 to be the same as a backlight brightness before the occurrence of the unusual status. The display control circuit 22 can be further integrated to a driving circuit of the backlight module 42. For example, the detection circuit 21 is disposed in the backlight module, and detects the unusual status according to a change in the backlight brightness.

Second Embodiment

Figure 5:
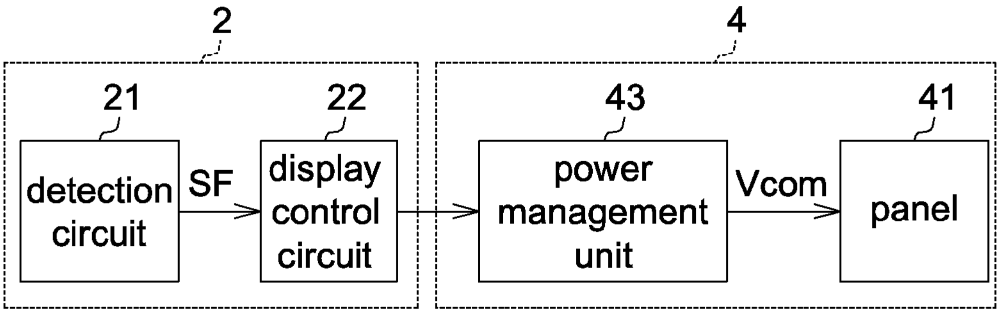
FIG. 5 is a schematic diagram of a frame maintaining circuit controlling a power management unit.

FIG. 5 shows a schematic diagram of a frame maintaining circuit controlling a power management unit. In certain display methods, a common voltage Vcom is adjusted to obtain a required frame. In the second embodiment, in the event of an unusual status, the frame maintaining circuit 2 controls the power management unit 43 to keep the common voltage Vcom unchanged, so as to prevent an erroneous frame. A display apparatus 4 includes a panel 41 and a power management unit 43. The power management unit 43 outputs the common voltage Vcom to the panel 41. According to the status feedback signal SF, the display control circuit 22 controls the power management unit 43 such that that common voltage Vcom generated by the power management unit 43 is the same as the common voltage before the occurrence of the unusual status. The display control circuit 22 can be further integrated to a power management unit 43.

Third Embodiment

Figure 6:
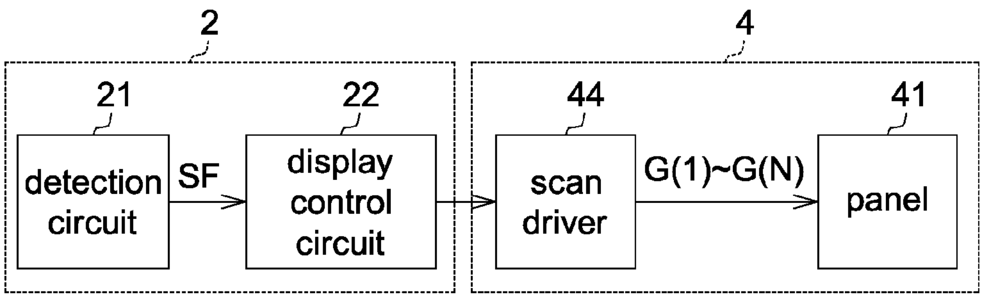
FIG. 6 is a schematic diagram of a frame maintaining circuit controlling a scan driver.

FIG. 6 shows a schematic diagram of a frame maintaining circuit controlling a scan driver. In the third embodiment, the frame maintaining circuit 2 controls the scan driver to stop outputting a scan signal in the occurrence of an unusual status to prevent an erroneous frame. A display panel 4 includes a panel 41 and a scan driver 44. The scan driver 44 outputs scan signals G(1) to G(N) for driving the panel 41. According to the status feedback signal SF, the display control circuit 22 controls the scan driver 44 to stop outputting the scan signals G(1) to G(N) to prevent an erroneous data write. The display control circuit 22 can be further integrated to the scan driver 44.

Fourth Embodiment

Figure 7:
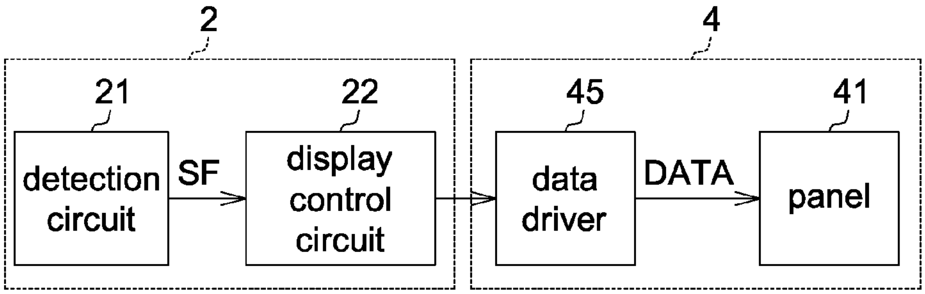
FIG. 7 is a schematic diagram of a frame maintaining circuit controlling a data driver.

FIG. 7 shows a schematic diagram of a frame maintaining circuit controlling a data driver. In the fourth embodiment, the frame maintaining circuit 2 controls the data driver to stop outputting a data signal in the occurrence of an unusual status to prevent an erroneous frame. A display apparatus 4 includes a panel 41 and a data driver 45. The data driver 45 outputs a data signal DATA to the panel 41. According to the status feedback signal SF, the display control circuit 45 controls the data driver 45 to stop outputting the data signal. The display control circuit 22 can be further integrated to the data driver 45. Further, according to the status feedback signal SF, the display control circuit 22 controls the data driver to stop outputting the data signal DATA and controls the scan driver to stop the corresponding scan signals G(1) to G(N) to prevent an erroneous data write.

Eighth Embodiment

Figure 8:
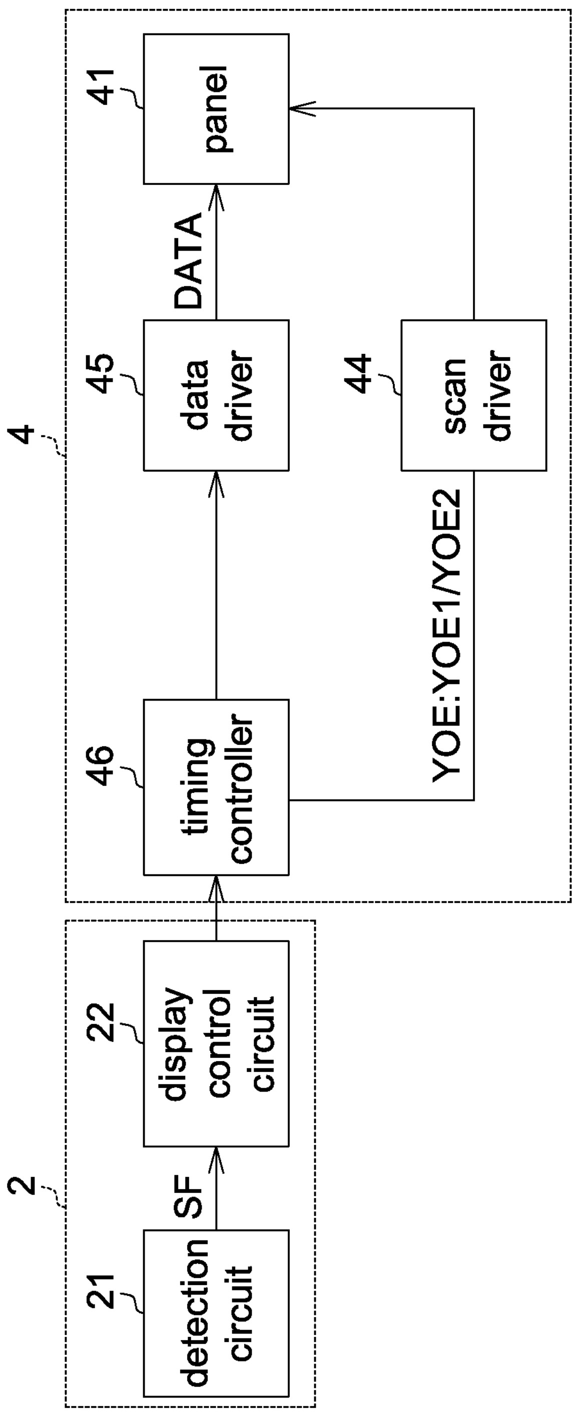
FIG. 8 is a schematic diagram of a frame maintaining circuit controlling a timing controller.

FIG. 8 shows a schematic diagram of a frame maintaining circuit controlling a timing controller. In the fifth embodiment, the frame maintaining circuit 2 controls the timing controlling to mask or stop outputting a signal in the occurrence of an unusual status to prevent an erroneous frame. A display apparatus 4 includes a panel 41, a scan driver 44, a data driver 45 and a timing controller 46. According to the status feedback signal SF, the display control circuit 22 controls the timing controller 46 to change an output enabling signal YOE from a first output enabling signal YOE1 to a second output enabling signal YOE2, so as to control the scan driver 44 to mask a corresponding scan signal. The display control circuit 22 can be further integrated to the timing controller 46.

Further, according to the status feedback signal SF, the display control circuit 22 also controls the timing controller 46 to stop outputting a signal to the data driver 45 and the scan driver 44. For example, the signal that the timing controller 46 stops outputting to the data driver 45 is a data signal DATA, a data loading signal LD or a clock signal CLK; the signal that the timing controller 46 stops outputting to the scan driver 44 is an output enabling signal YOE (or referred to as a gate control signal) or a clock signal YCLK. When the unusual status is eliminated, the display control circuit 22 controls the timing controller 46 to first synchronize the signals to be outputted to the data driver 45 and the scan driver 44, and then output the synchronized signals to the data driver 45 and the scan driver 44.

Figure 9:
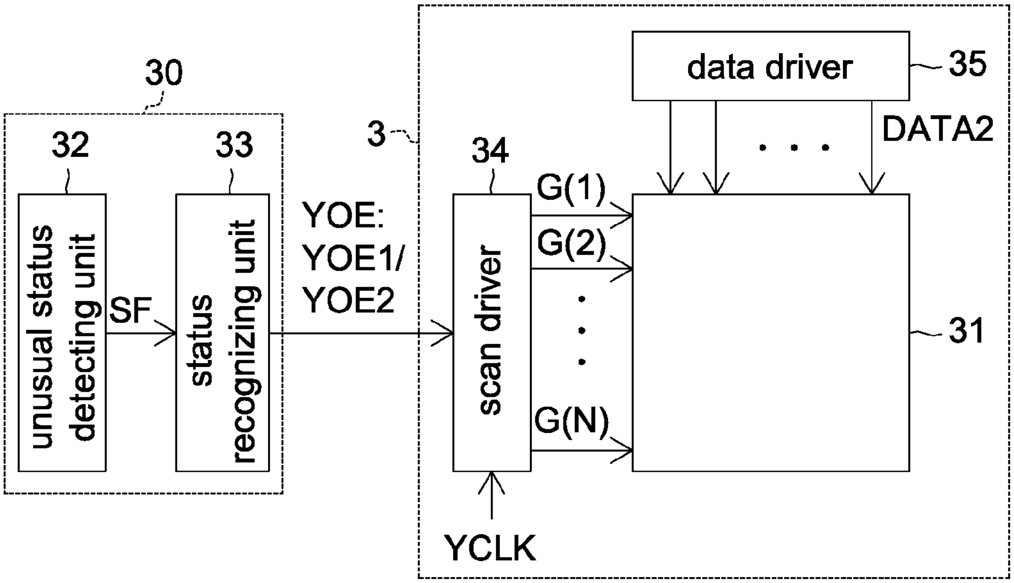
FIG. 9 is a schematic diagram of a display apparatus.
Figure 10:
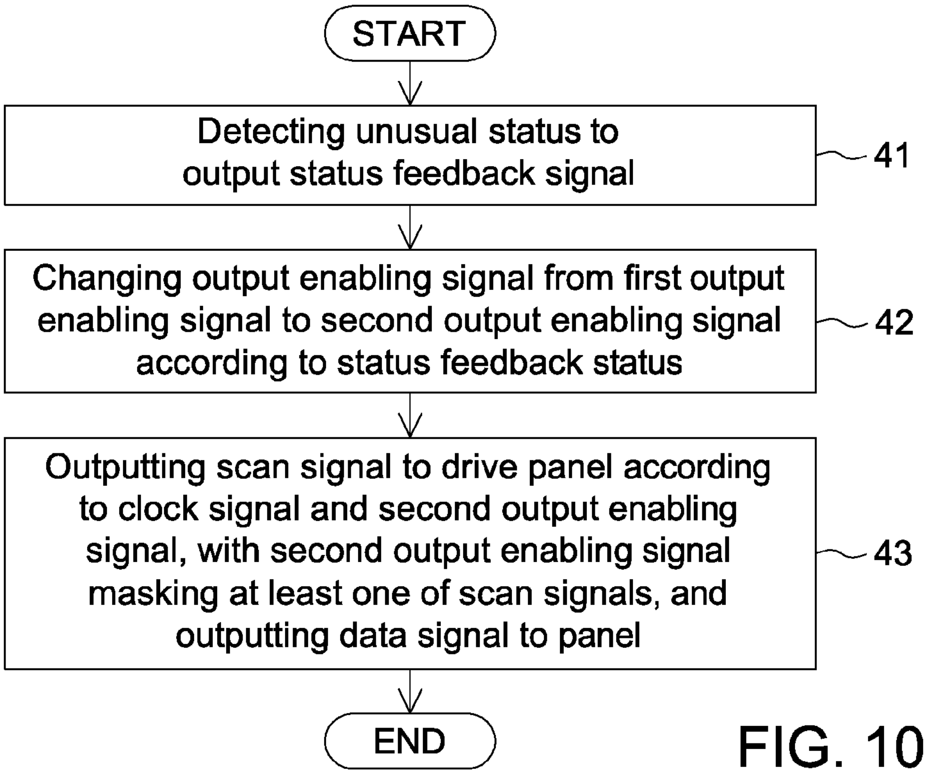
FIG. 10 is a flowchart of a display method.
Figure 11:
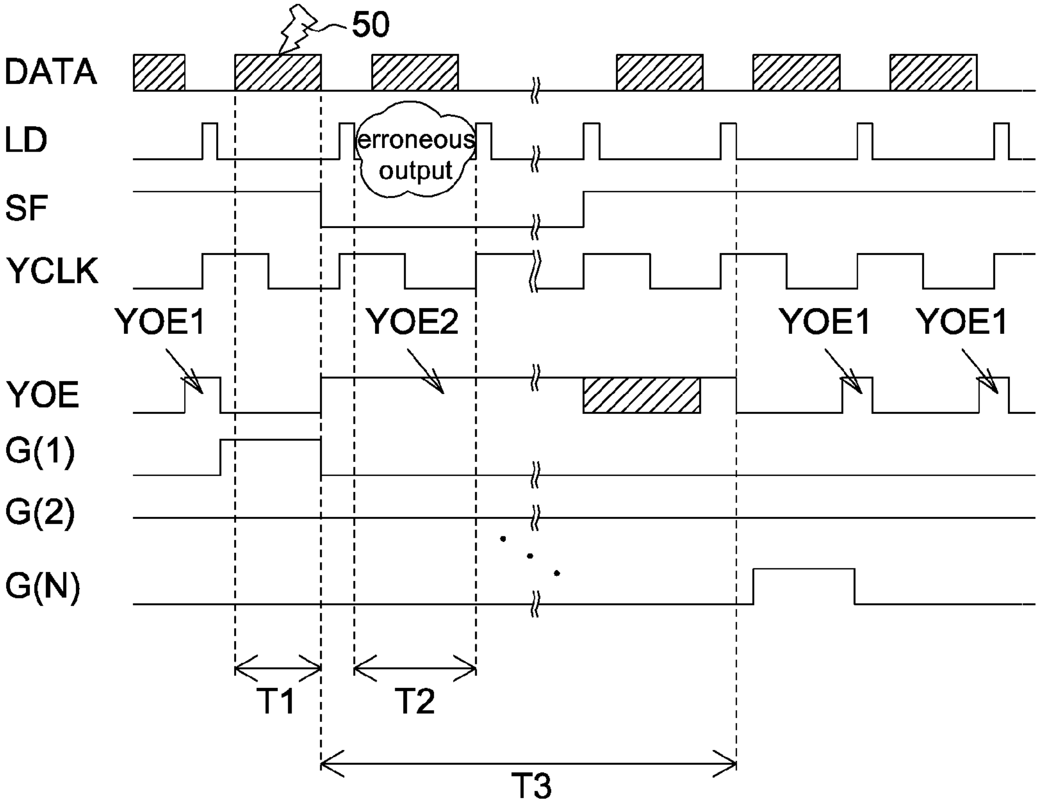
FIG. 11 is a signal timing diagram according to a preferred embodiment of the present invention.

FIG. 9 shows a schematic diagram of a display apparatus. FIG. 10 shows a flowchart of a display method. FIG. 11 shows a signal timing diagram according to a preferred embodiment of the present invention. A display apparatus 3 includes a panel 31, a frame maintaining circuit 30, a scan driver 34 and a data driver 35. The frame maintaining circuit 30 includes an unusual status detection unit 32 and a status recognizing unit 33. For example, the detection circuit 21 is the unusual status detecting circuit 32 in FIG. 9, and the display control circuit 22 is the status recognizing unit 33 in FIG. 9. As shown in Step 41, the unusual status detecting circuit 32 detects an unusual status 50 and outputs a status feedback signal SF. For example, the unusual status 50 is electrostatic discharge (ESD) or power noise. The unusual status 50 is likely to causes a data error to the data driver 35, or to cause the scan driver 34 to output an erroneous scan signal.

As shown in Step 42, according to the status feedback signal SF, the status recognizing unit 33 changes an output enabling signal YOE from a first output enabling signal YOE1 to a second output enabling signal YOE2. For example, a pulse width of the second output enabling signal YOE2 is greater than that of the first output enabling signal YOE1. As shown in Step 43, according to a clock signal YCLK and the second output enabling signal YOE2, the scan driver 34 outputs scan signals G(1) to G(N) to drive the panel 31, with the second output enabling signal YOE2 masking at least one of the scan signals G(1) to G(N). Further, the data driver 35 outputs a data signal DATA2 to the panel 31. In the occurrence of the unusual status 50, the second output enabling signal YOE2 masks a corresponding signal, and so the display apparatus 3 is prevented from displaying an erroneous frame.

For example, when the unusual status 50 occurs in the data signal DATA2 of the data driver 35 in a data period T1, a data loading signal LD controls the data driver 35 to load the data signal DATA2 affected by the unusual status 50 to a data line of the panel 31 in loading period T2. In a mask period T3, the second output enabling signal YOE2 masks the corresponding scan signal G(2), such that the scan signal G(2) is at a disable level to prevent the panel 31 from displaying the erroneous data signal DATA in T2 affected by the unusual status 50. It is noted that the mask period T3 can be adjusted to a time allowing the second output enabling signal YOE2 to mask a plurality of scan signals or adjusted to an entire frame time.

Figure 12:
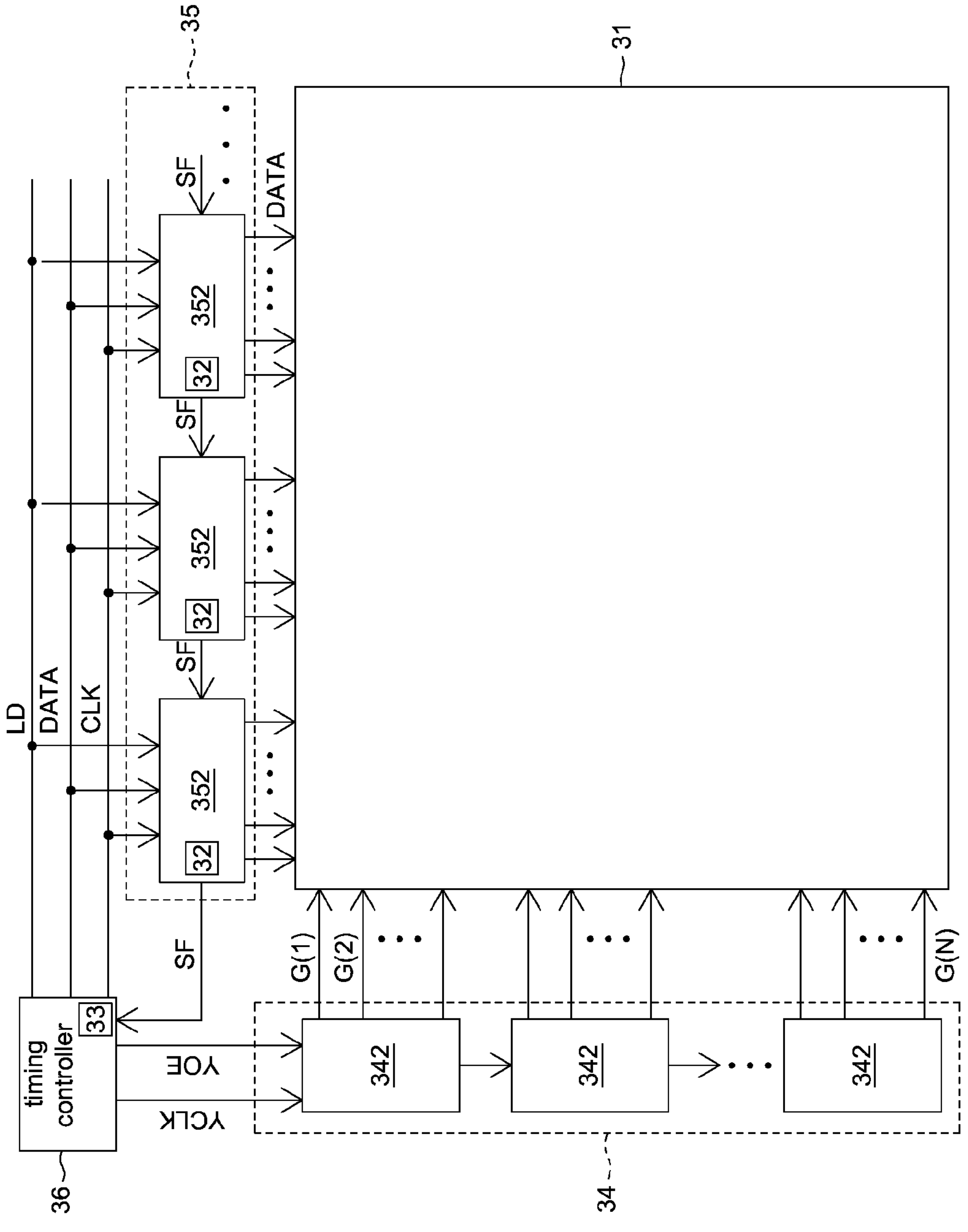
FIG. 12 is a schematic diagram of an unusual status detecting unit and a status recognizing unit being respectively disposed in a data driver and a timing controller.

FIG. 12 shows a schematic diagram of an unusual status detecting unit and a status recognizing unit being respectively disposed in a data driver and a timing controller. The display apparatus 3 further includes a timing controller 36. The scan driver 34 further includes a plurality of scan driving integrated circuits 342, and the data driver 35 further includes a plurality of data driving integrated circuits 352. For example, the unusual status detecting unit 32 is disposed in the data driving integrated circuits 352 to detect an unusual status, and the status recognizing unit 33 is disposed in the timing controller 36 to change the first output enabling signal YOE1 into a second output enabling signal YOE2 according to the status feedback signal SF.

Figure 13:
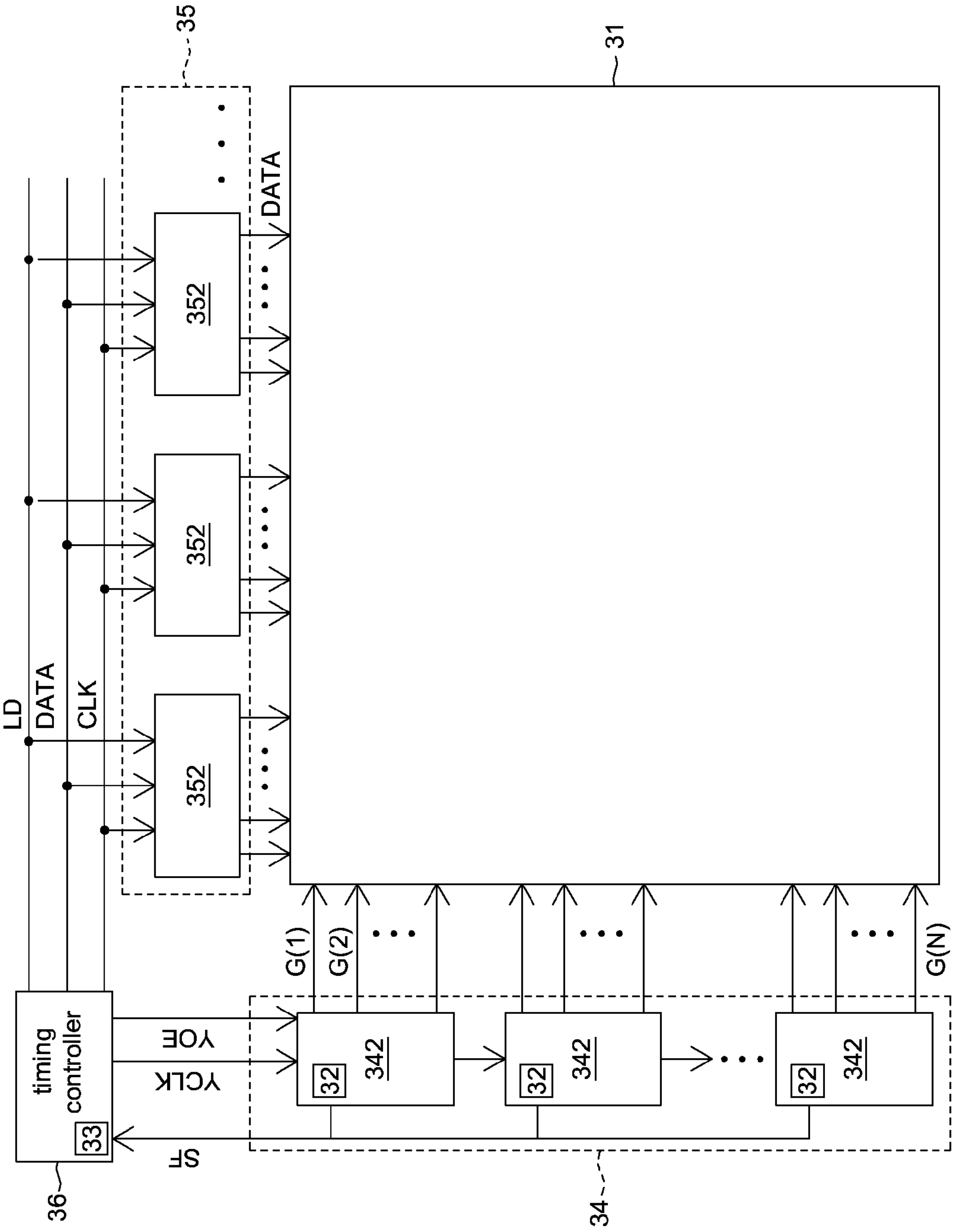
FIG. 13 is a schematic diagram of an unusual status detecting unit and a status recognizing unit being respectively disposed in a scan driver and a timing controller.

FIG. 13 shows a schematic diagram of an unusual status detecting unit and a status recognizing unit being respectively disposed in a scan driver and a timing controller. A main difference between FIGS. 12 and 13 is that, for example, the unusual status detecting unit 32 in FIG. 13 is disposed in the scan driving integrated circuits 342 of the scan driver 34 to detect an unusual status. According to the status feedback signal SF, the status recognizing unit 33 disposed in the timing controller 36 changes the first output enabling signal YOE1 to a second output enabling signal YOE2.

Figure 14:
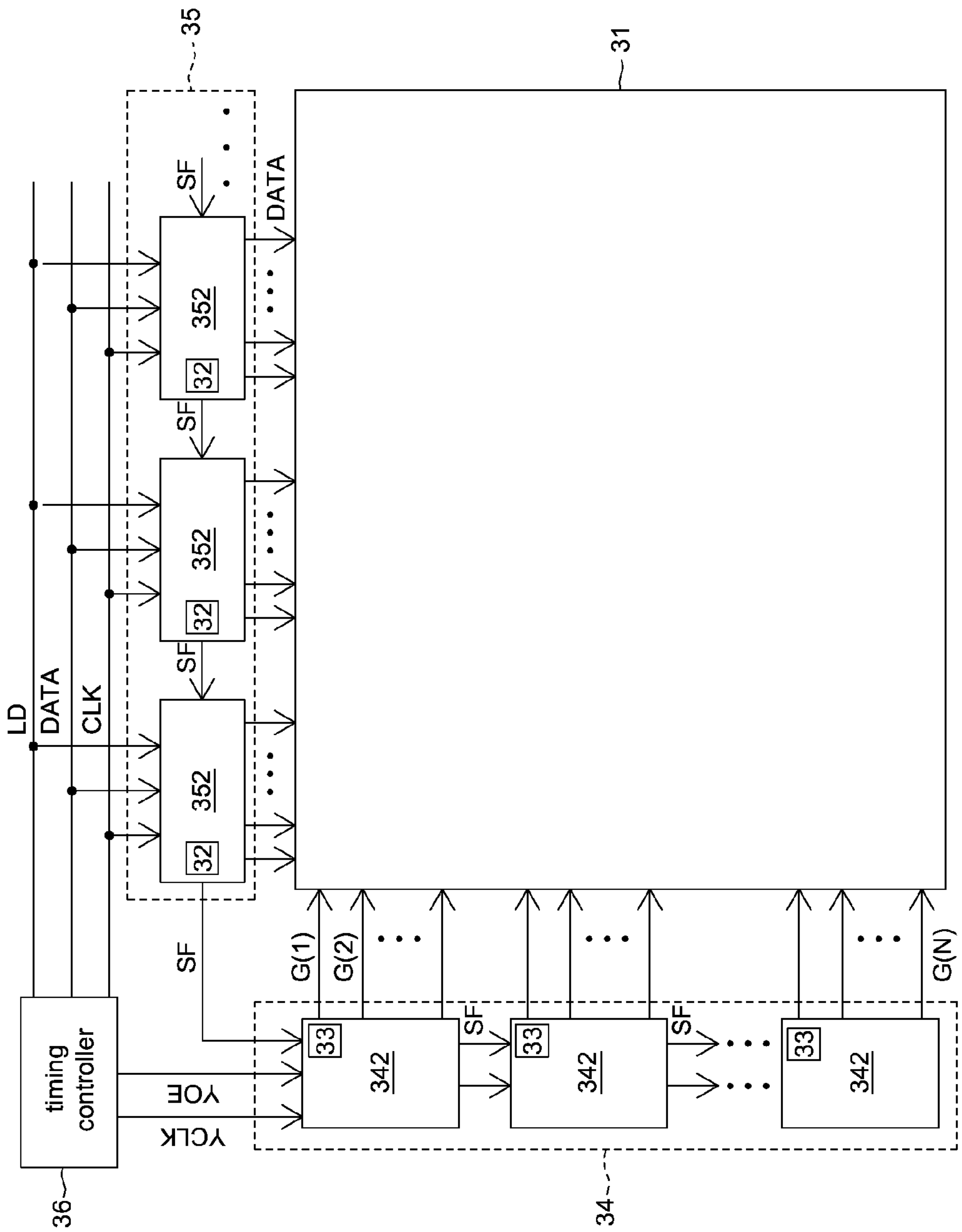
FIG. 14 is a schematic diagram of an unusual status detecting unit and a status recognizing unit respectively disposed in a data driver and a scan driver.

FIG. 14 shows a schematic diagram of an unusual status detecting unit and a status recognizing unit respectively disposed in a data driver and a scan driver. A main difference between FIGS. 12 and 14 is that, for example, the status recognizing unit 33 in FIG. 14 is disposed in the scan driving integrated circuits 342 of the scan driver 34 to change the first output enabling signal YOE1 to a second output enabling signal YOE2 according to the status feedback signal SF. According to the clock signal YCLK and the second output enabling signal YOE2, the scan driving integrated circuits 342 output the scan signals G(1) to G(N).

Figure 15:
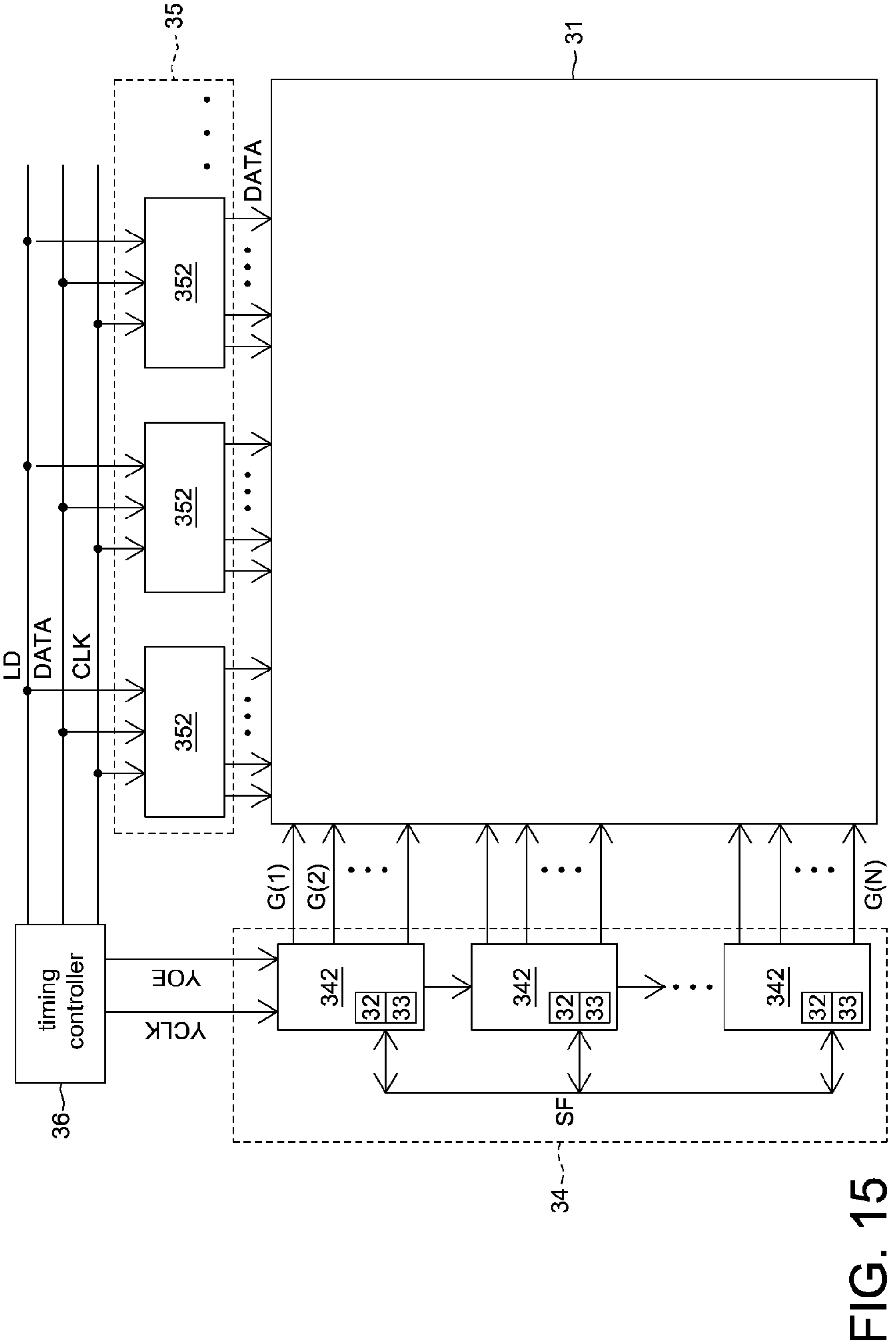
FIG. 15 is a schematic diagram of an unusual status detecting unit and a status recognizing unit disposed in a scan driver.

FIG. 15 shows a schematic diagram of an unusual status detecting unit and a status recognizing unit disposed in a scan driver. A main difference between FIGS. 14 and 15 is that, for example, the unusual status detecting unit 32 and the status recognizing unit 33 in FIG. 15 are disposed in the scan driving integrated circuits 342 of the scan driver 34.

Figure 16:
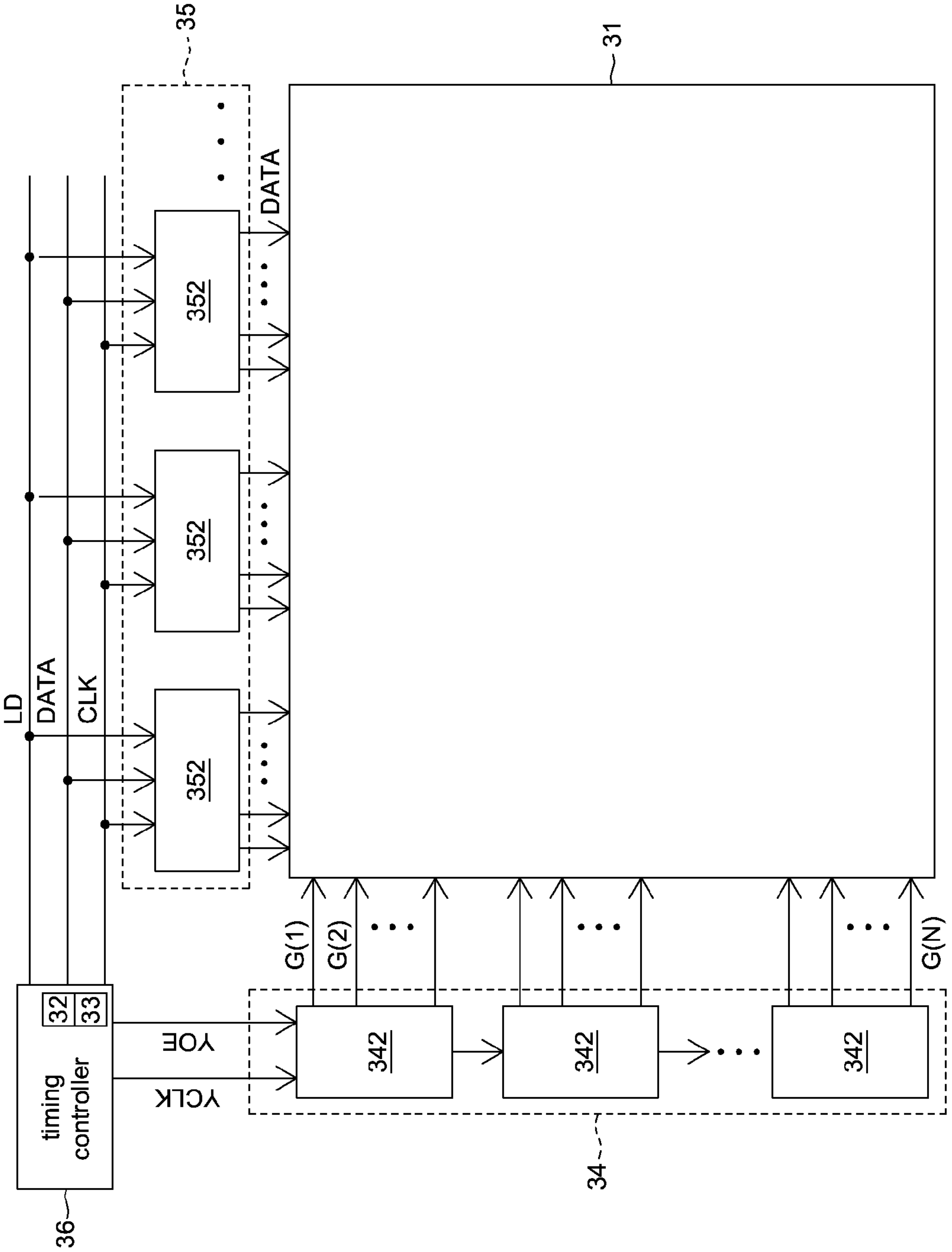
FIG. 16 is a schematic diagram of an unusual status detecting unit and a status recognizing unit disposed in a scan driver.

FIG. 16 shows a schematic diagram of an unusual status detecting unit and a status recognizing unit disposed in a scan driver. A main difference between FIGS. 14 and 16 is that, for example, the unusual status detecting unit 32 and the status recognizing unit 33 in FIG. 16 are disposed in the timing controller 36.

Figure 17:
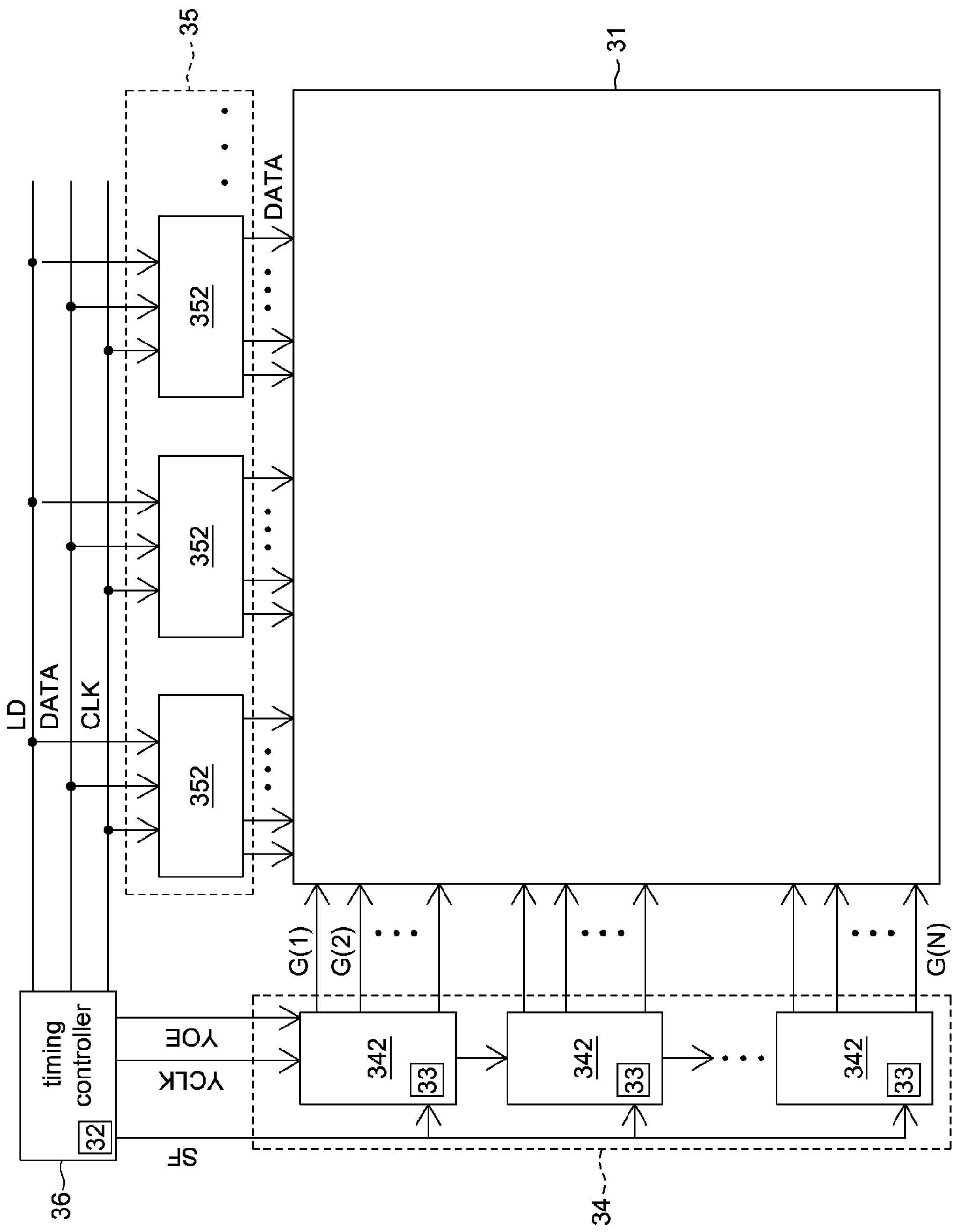
FIG. 17 is a schematic diagram of an unusual status detecting unit and a status recognizing unit respectively disposed in a timing controller and a scan driver.

FIG. 17 shows a schematic diagram of an unusual status detecting unit and a status recognizing unit respectively disposed in a timing controller and a scan driver. A main difference between FIGS. 13 and 17 is that, the unusual status detecting unit 32 in FIG. 17 is disposed in the timing controller 16, and the status recognizing unit 33 in FIG. 17 is disposed in the scan driving integrated circuits 342 of the scan driver 34.

Figure 18:
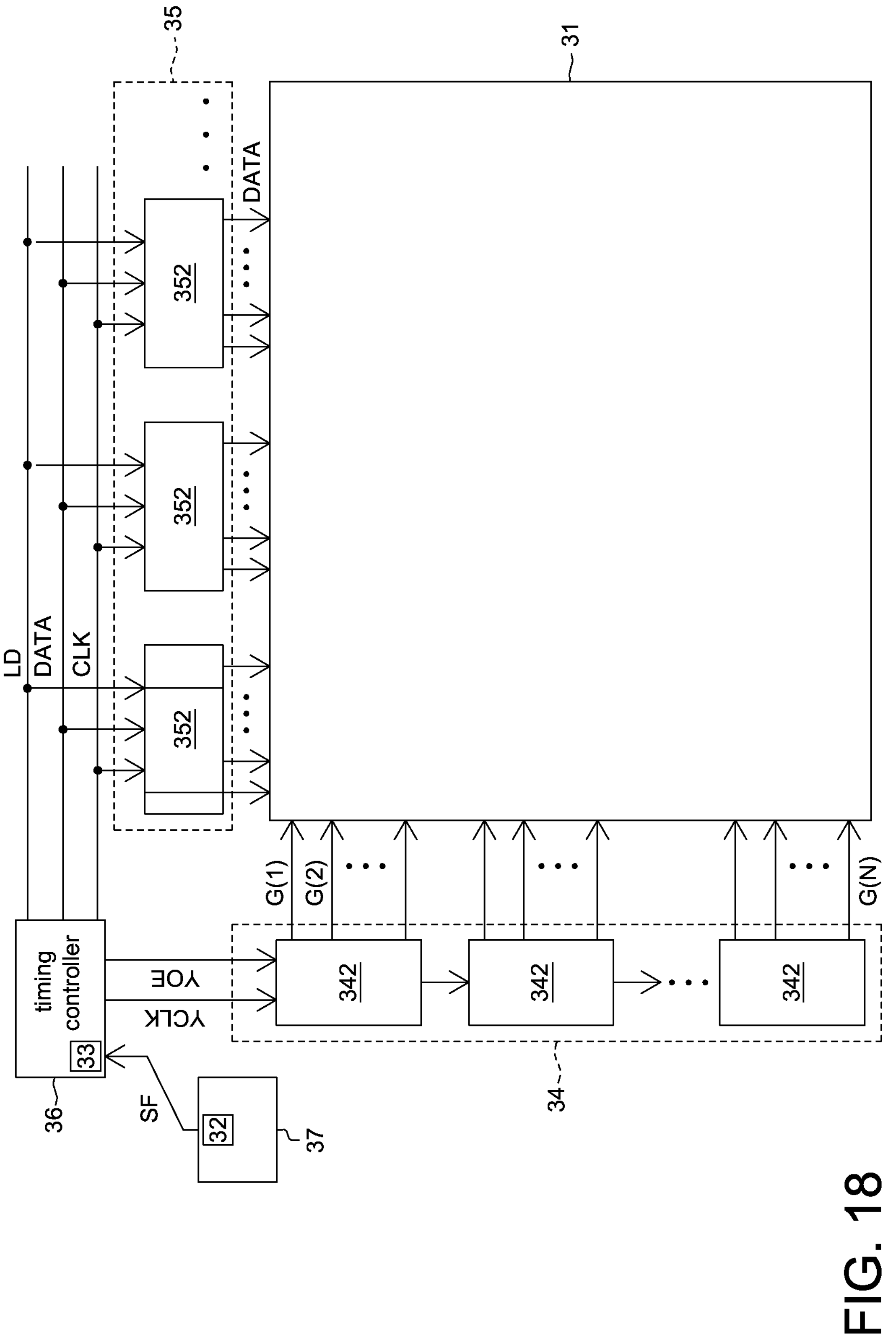
FIG. 18 is a schematic diagram of an unusual status detecting unit and a status recognizing unit respectively disposed in a power management unit and a timing controller.

FIG. 18 shows a schematic diagram of an unusual status detecting unit and a status recognizing unit respectively disposed in a power management unit and a timing controller. A main difference between FIGS. 13 and 18 is that, the unusual status detecting unit 32 in FIG. 18 is disposed in the power management unit 37.

Figure 19:
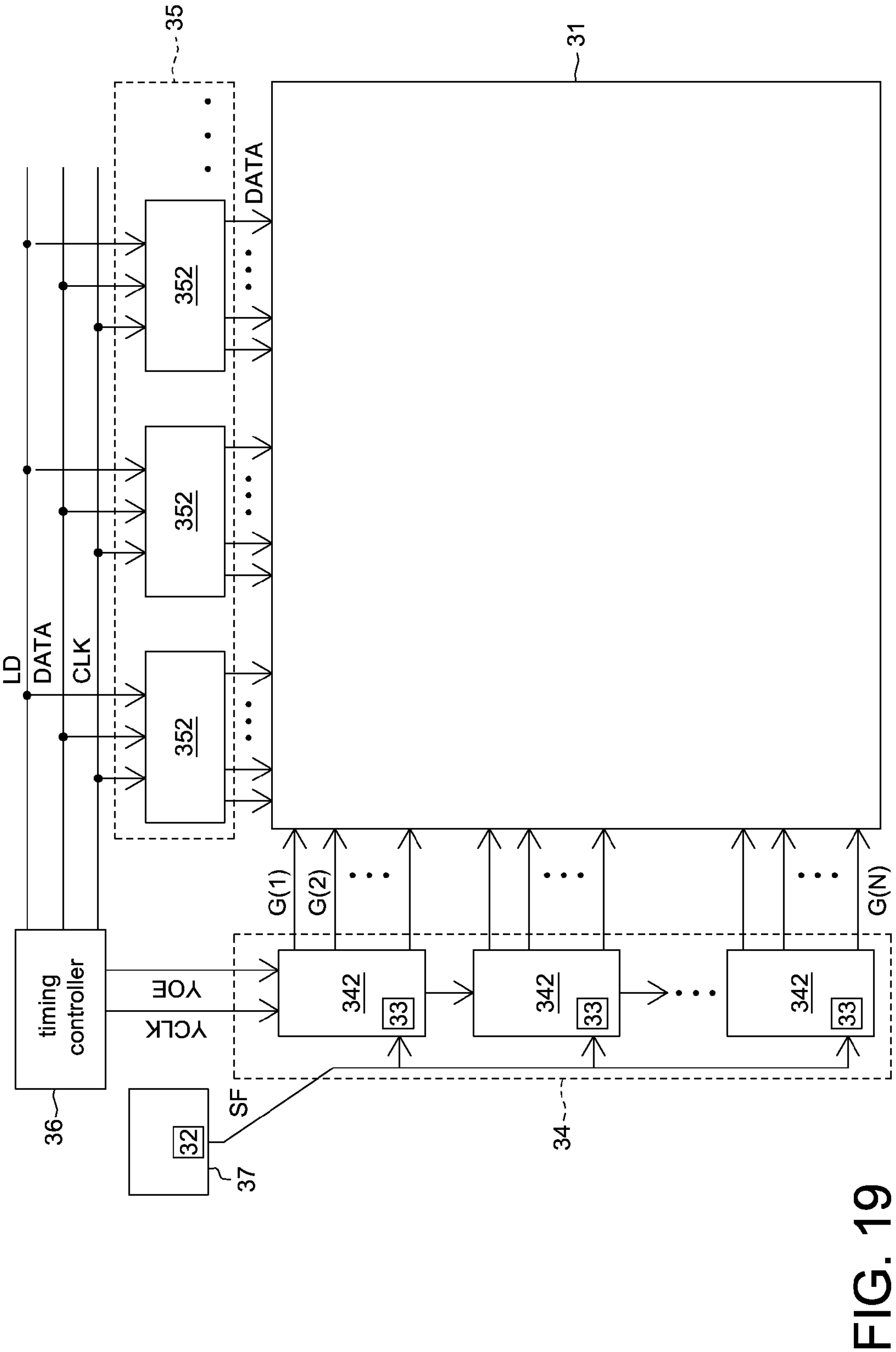
FIG. 19 is a schematic diagram of an unusual status detecting unit and a recognizing unit respectively disposed in a power management unit and a scan driver.

FIG. 19 shows a schematic diagram of an unusual status detecting unit and a recognizing unit respectively disposed in a power management unit and a scan driver. A main difference between FIGS. 18 and 19 is that, the status recognizing unit 33 in FIG. 19 is disposed in the scan driving integrated circuits 342 of the scan driver 34.

Figure 20:
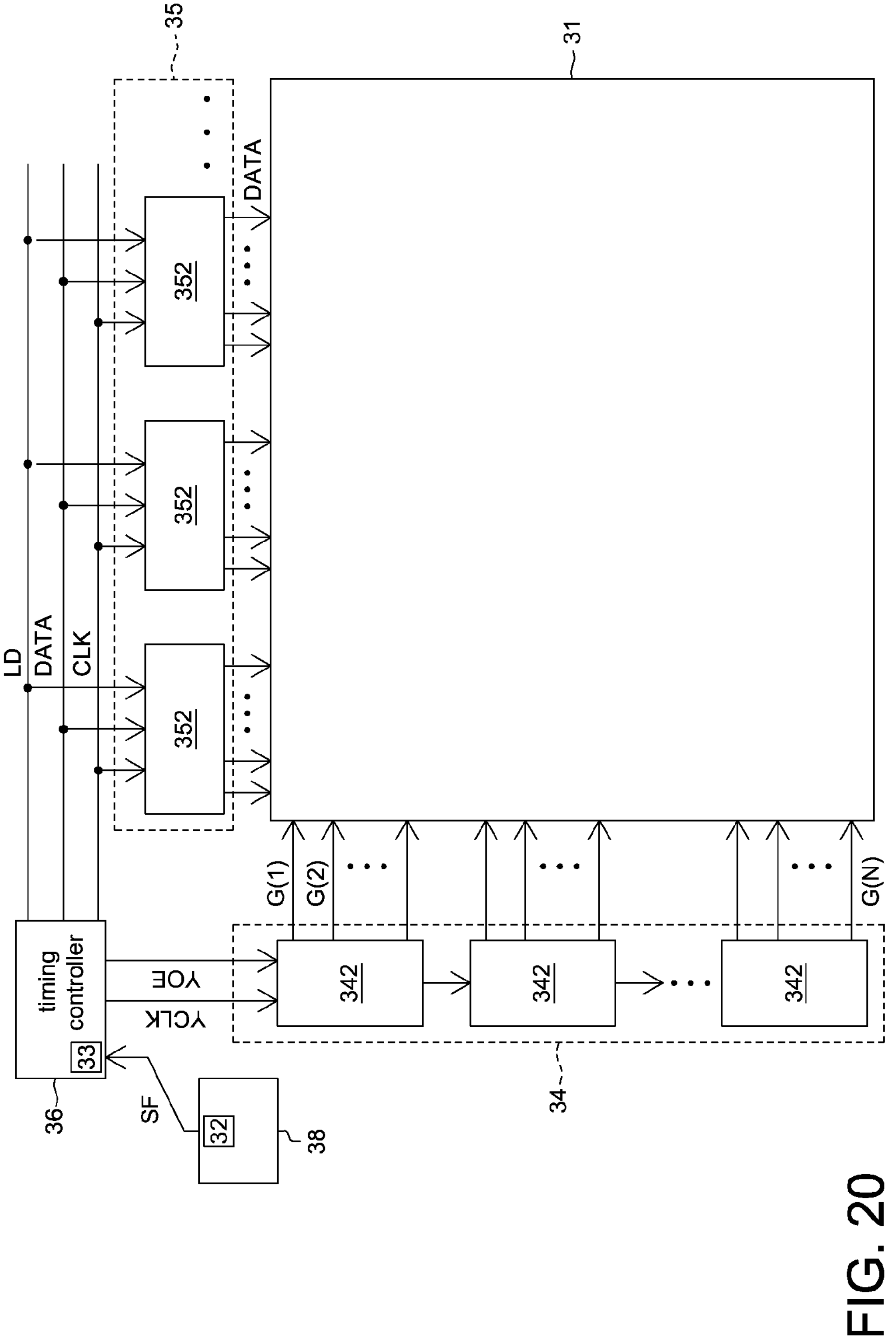
FIG. 20 is a schematic diagram of an unusual status detecting unit and a status recognizing unit respectively disposed in a backlight module and a timing controller.

FIG. 20 shows a schematic diagram of an unusual status detecting unit and a status recognizing unit respectively disposed in a backlight module and a timing controller. A main difference between FIGS. 18 and 20 is that, the unusual status detecting unit 32 in FIG. 20 is disposed in the backlight module 38.

Figure 21:
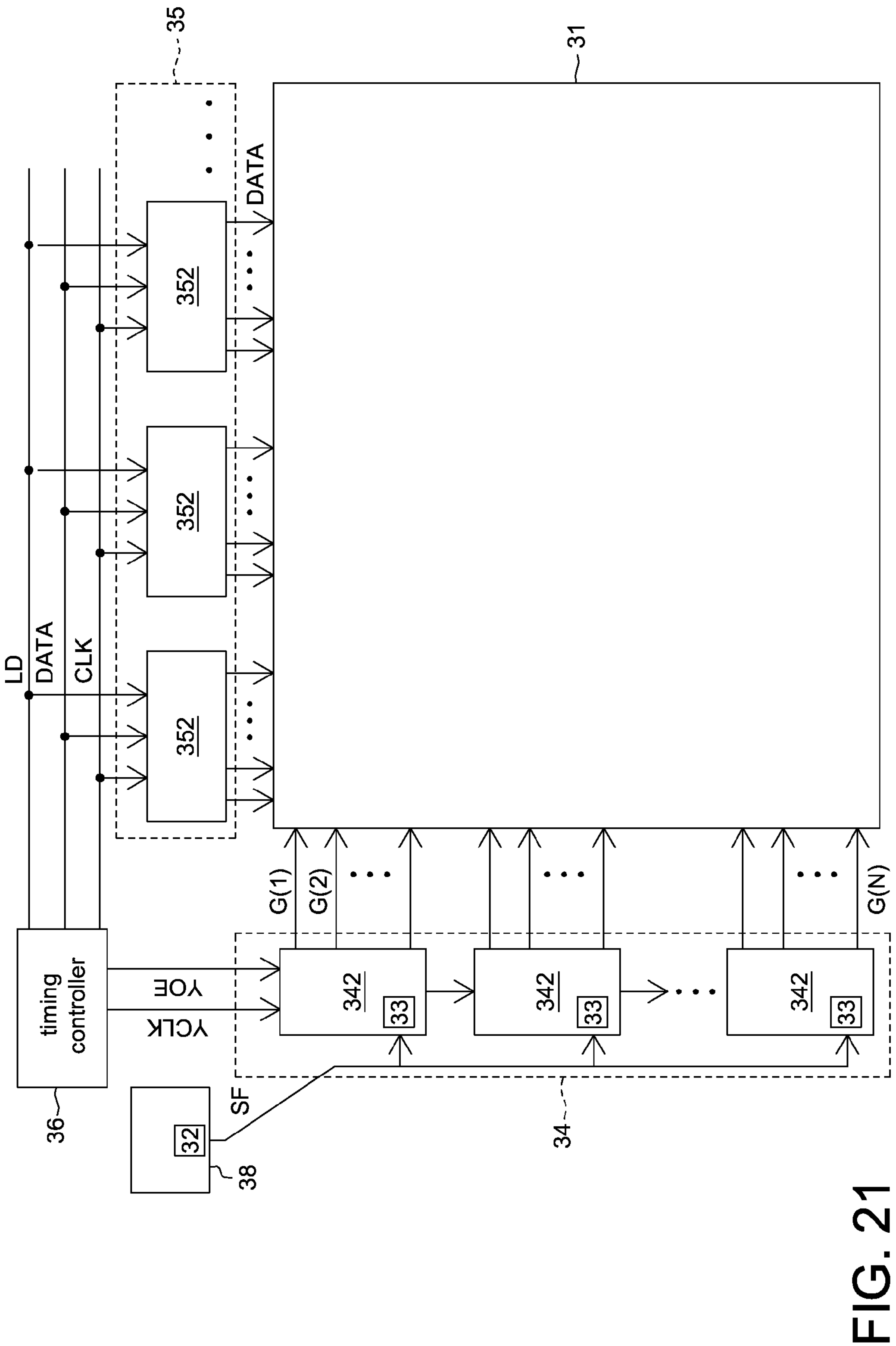
FIG. 21 is a schematic diagram of an unusual status detecting unit and a status recognizing unit respectively disposed in a backlight module and a scan driver.

FIG. 21 shows a schematic diagram of an unusual status detecting unit and a status recognizing unit respectively disposed in a backlight module and a scan driver. A main difference between FIGS. 20 and 21 is that, the status recognizing unit 33 in FIG. 21 is disposed in the scan driving integrated circuits 342 of the scan driver 34.

Figure 22:
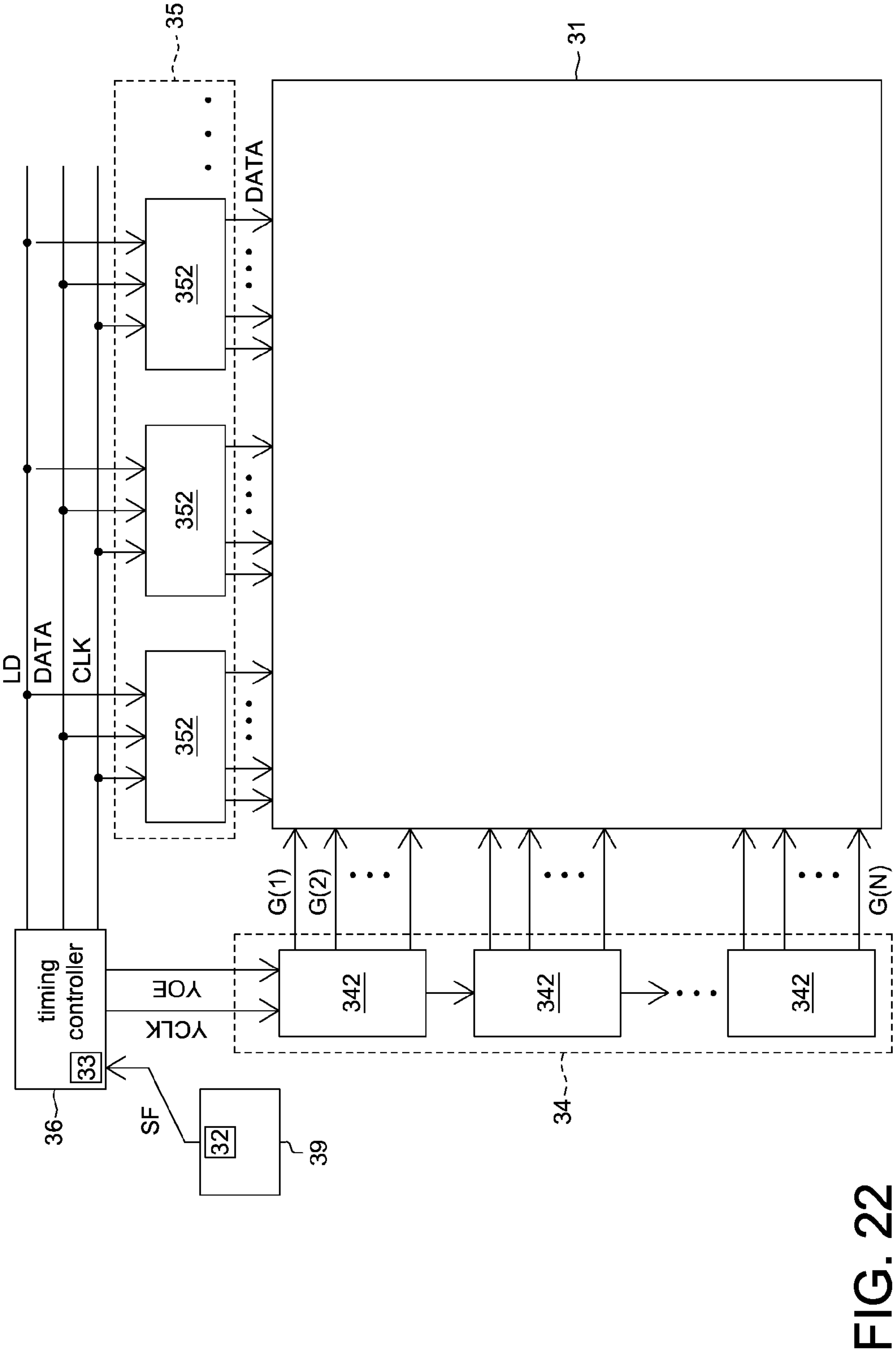
FIG. 22 is a schematic diagram of an unusual status detecting unit and a status recognizing unit respectively disposed in a printed circuit board and a timing controller.

FIG. 22 shows a schematic diagram of an unusual status detecting unit and a status recognizing unit respectively disposed in a printed circuit board and a timing controller. A main difference between FIGS. 20 and 22 is that, the unusual status detecting unit 32 in FIG. 22 is disposed in the printed circuit board 39.

Figure 23:
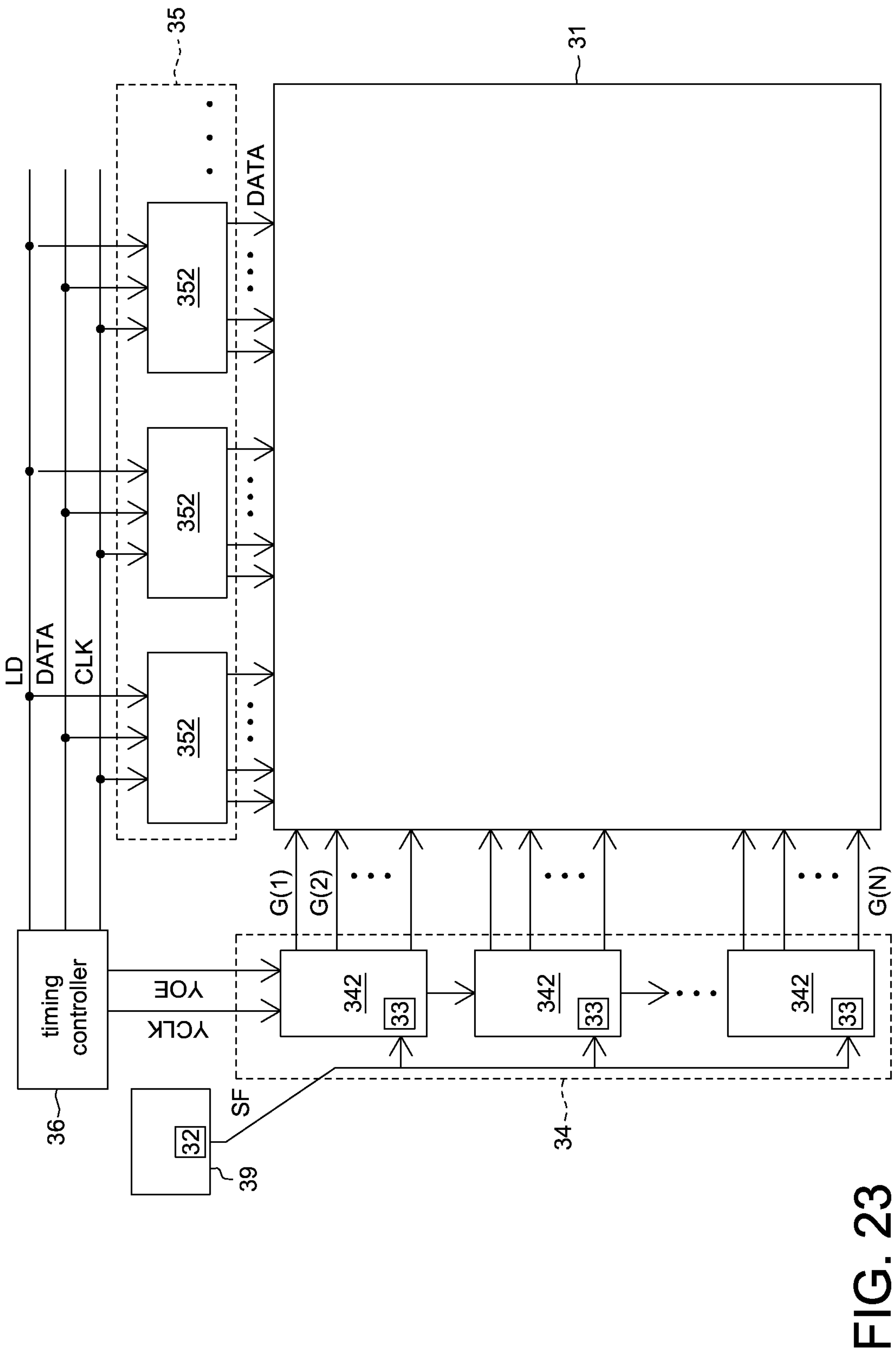
FIG. 23 is a schematic diagram of an unusual status detecting unit and a status recognizing unit respectively disposed in a printed circuit board and a scan driver.

FIG. 23 shows a schematic diagram of an unusual status detecting unit and a status recognizing unit respectively disposed in a printed circuit board and a scan driver. A main difference between FIGS. 22 and 23 is that, the status recognizing unit 33 in FIG. 23 is disposed in the scan driving integrated circuits 342 of the scan driver.

Figure 24:
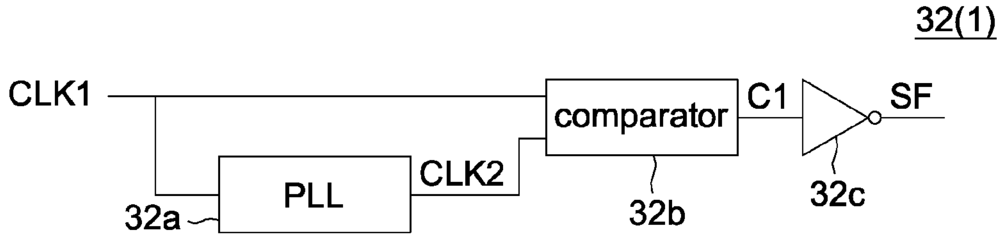
FIG. 24 is a schematic diagram of a first unusual status detecting unit.
Figure 25:
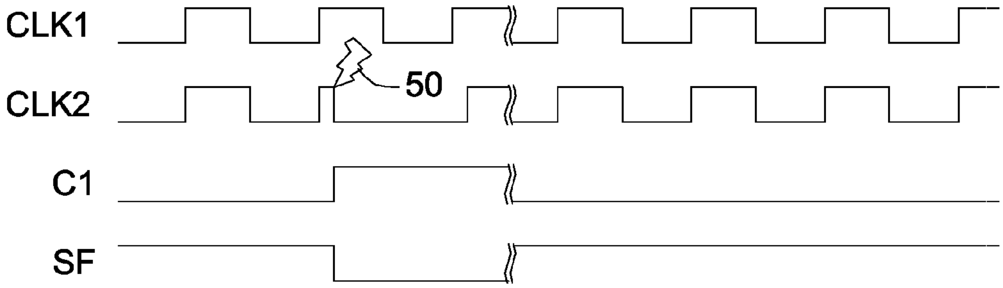
FIG. 25 is a signal timing diagram of a first unusual status detecting unit.

FIG. 24 shows a schematic diagram of a first unusual status detecting unit; FIG. 25 shows a signal timing diagram of a first unusual status detecting unit. The foregoing unusual status detecting unit 32 is exemplified by an unusual status detecting unit 32(1) in FIG. 24. The unusual status detecting unit 32(1) includes a phase locked loop (PLL) 32*a*, a comparator 32*b* and a phase inverter 32*c*. The PLL 32*a* receives a first clock signal CLK1, and outputs a second clock signal CLK2 according to the first clock signal CLK1.

The comparator 32*b* outputs a comparison signal C1 according to the first clock signal CLK1 and the second clock signal CLK2. Further, as an unusual status 50 occurs, a frequency of the first clock signal CLK1 differs from that of the second clock signal CLK2 to prompt the CLK2 to output a comparison signal C1. The phase inverter 32*c* further outputs a status feedback signal SF according to the comparison signal C1.

Figure 26:
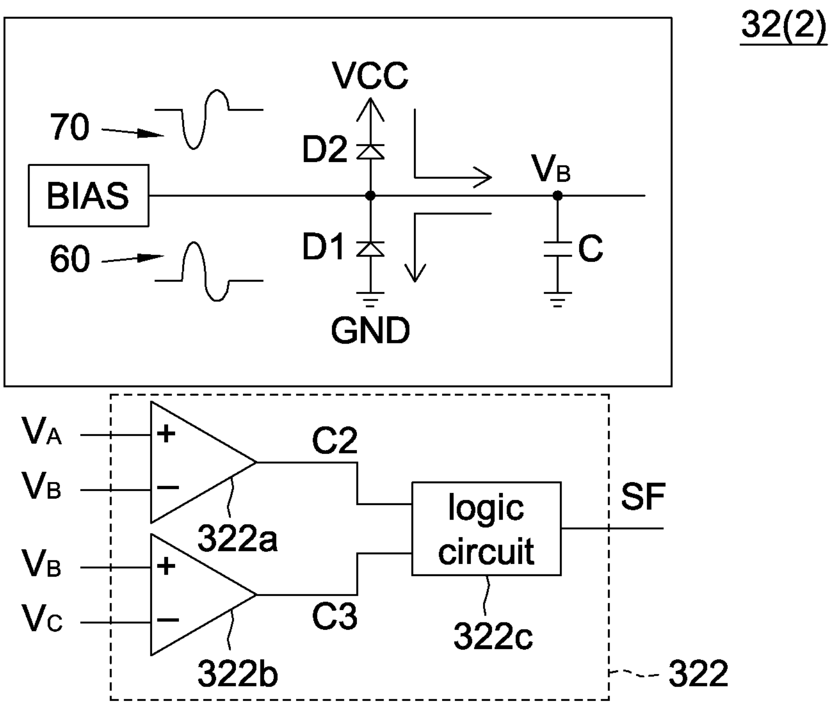
FIG. 26 is a schematic diagram of a second unusual status detecting unit.
Figure 27:
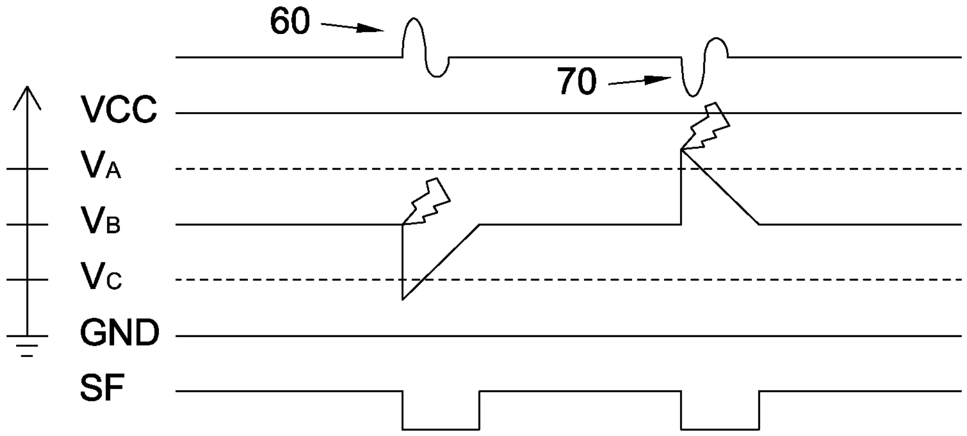
FIG. 27 is a signal timing diagram of a second unusual status detecting unit.

FIG. 26 shows a schematic diagram of a second unusual status detecting unit; FIG. 27 shows a signal timing diagram of a second unusual status detecting unit. The foregoing unusual status detecting unit 32 is exemplified by an unusual status detecting unit 32(2) in FIG. 27. The unusual status detecting unit 32(2) includes a capacitor C, a first diode DA1, a second diode DA2 and a bias voltage detection circuit 322. The first diode DA1 and the capacitor C are coupled in parallel, and the second diode DA2 is coupled to the capacitor C and the first diode DA1. The bias voltage detection circuit 322 outputs a status feedback signal SF when a storage voltage $V_B$ of the capacitor C is greater than a first level $V_A$ or smaller than a second level $V_C$.

The bias voltage detection circuit 322 includes a first comparator 322*a*, a second comparator 322*b* and a logic circuit 322*c*. For example, the logic circuit 322*c* is an AND gate. The first comparator 322*a* outputs a first comparison signal C2 according to the storage voltage $V_B$ and the first level $V_A$. The second comparator 322*b* outputs a second comparison signal C3 according to the storage voltage $V_B$ and the second level $V_C$. The logic circuit 322*c* outputs the status feedback signal SF according to the first comparison signal C2 and the second comparison signal C3.

For example, when the voltage of the power noise 60 is pulled up in a way that the first diode DA1 becomes turned on, the capacitor C is discharged via the first diode DA1 such that the storage voltage $V_B$ of the capacitor C is lowered. When the storage voltage $V_B$ of the capacitor C drops to the second level $V_C$, the second comparator 322*b* outputs the second comparison signal C3. In contrast, when the voltage of the power noise 70 is reduced in a way that the second diode DA2 becomes turned off, the capacitor C is charged via the second diode DA2 such that the storage voltage $V_B$ of the capacitor C is increased. When the storage voltage $V_B$ of the capacitor C rises to the first level $V_A$, the first comparator 322*a* outputs the first comparison signal C2, and the logic circuit 322*c* outputs the status feedback signal SF according to the first comparison signal C2 and the second comparison signal C3.

Figure 28:
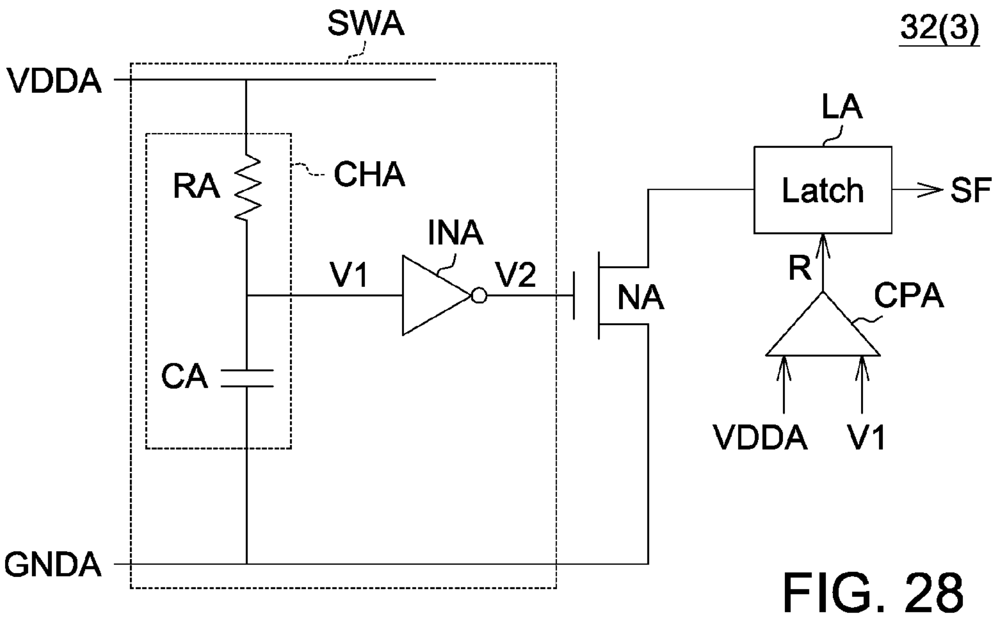
FIG. 28 is a schematic diagram of a third unusual status detecting unit.

FIG. 28 shows a schematic diagram of a third unusual status detecting unit. The foregoing unusual status detecting unit 32 is exemplified by an unusual status detecting unit 32(3) in FIG. 28. The unusual status detecting unit 32(3) includes a latch LA, a switch NA, a comparator CPA and a switch control circuit SWA. The switch NA is coupled to the latch LA. The comparator CPA provides a reset signal R to the latch LA. The switch control circuit SWA is coupled to the switch NA, and turns on the switch NA to change a voltage V3 to a low potential that is substantially equal to a ground voltage GNDA in the event of an unusual status. Thus, the switch control circuit SWA controls the switch NA to write the ground voltage GNDA to the latch LA and to output a status feedback signal SF. A supply voltage VDDA restores to an original potential when the unusual status ceases. The comparator CPA compares the supply voltage VDDA and a charging voltage V1. The reset signal R is at a high potential when a difference between the supply voltage VDDA and the charging voltage VA is smaller than a threshold, and is conversely at a low potential when the difference between the supply voltage VDDA and the charging voltage V1 is not smaller than the threshold.

Further, the switch control circuit SWA includes a charging circuit CHA and a phase inverter INA. The charging circuit CHA provides the charging voltage V1 according to the ground voltage GNDA and the supply voltage VDDA, where the supply voltage VDDA is greater than the ground voltage GNDA. The phase inverter INA outputs an inverted signal V2 to a control terminal of the switch NA according to the charging voltage V1. The comparator outputs the reset signal R according to the charging voltage V1 and the supply voltage VDDA.

The charging circuit CHA includes a resistor RA and a capacitor CA. The resistor RA has one terminal for receiving the supply voltage VDDA, and the capacitor CA has one terminal coupled to the other terminal of the resistor RA. The phase inverter INA has one terminal coupled to one terminal of the capacitor CA and the other terminal of the resistor RA, and one output terminal coupled to a control terminal of the switch NA.

Figure 29:
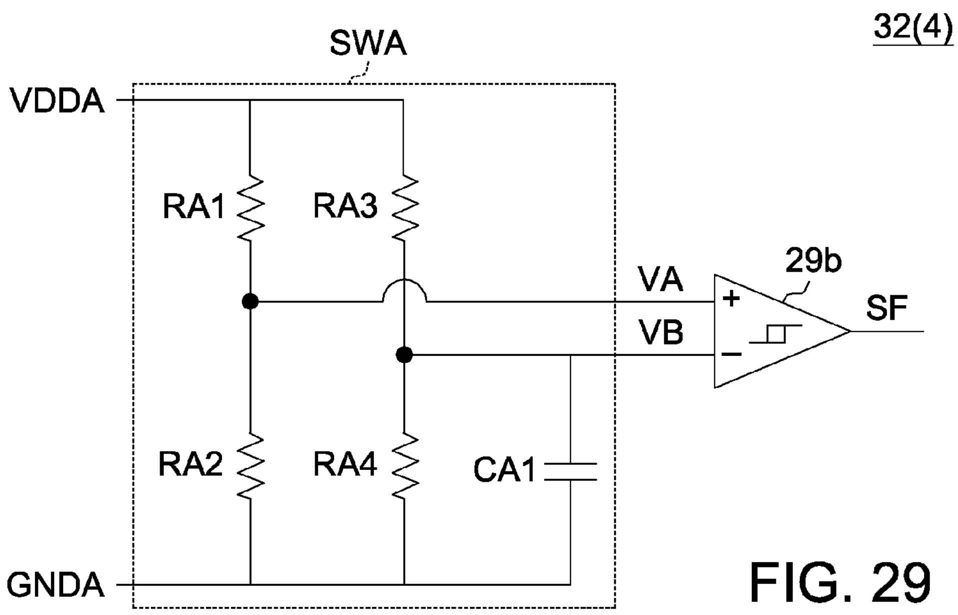
FIG. 29 is a schematic diagram of a fourth unusual status detecting unit.

FIG. 29 shows a schematic diagram of a fourth unusual status detecting unit. The foregoing unusual status detecting unit 32 is exemplified by an unusual status detecting unit 32(4) in FIG. 29. The unusual status detecting unit 32(4) includes a voltage-dividing circuit 29*a* and a Schmitt trigger 29*b*. The voltage-dividing circuit 29*a* generates a divided voltage VA and a divided voltage VB according to a ground voltage GNDA and a supply voltage VDDA. The voltage-dividing circuit 29*a* includes resistors RA1 to RA4 having a same resistance value and a capacitor CA1. The resistor RA2 is coupled to the resistor RA1 to provide the divided voltage VA. The resistor RA4 is coupled to the capacitor CA1 in parallel and coupled to the resistor RA3 in series to provide the divided voltage VB. The capacitor CA1 is coupled to the resistor RA4 in parallel, inferring that a change in the divided voltage VB is smaller than that in the divided voltage VA. The Schmitt trigger 29*b* outputs a feedback signal SF when a difference between the divided voltage VA and the divided voltage VB is greater than a threshold voltage.

Figure 30:
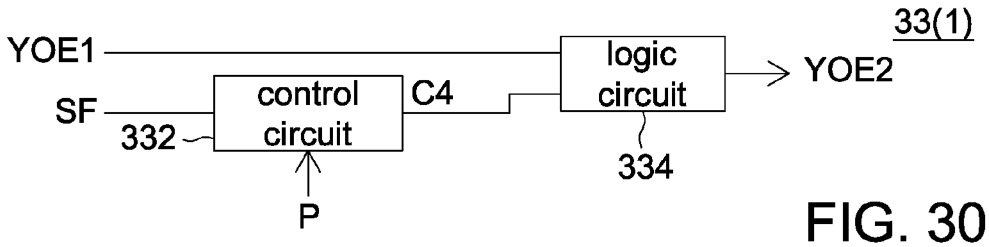
FIG. 30 is a schematic diagram of a first status recognizing unit.

FIG. 30 shows a schematic diagram of a first status recognizing unit. The foregoing status recognizing unit 33 is exemplified by a status recognizing unit 33(1) in FIG. 30. The status recognizing unit 33(1) includes a control unit 332 and a logic unit 334. The control unit 332 outputs a control signal C4 according to the status feedback signal SF and a periodic signal P. For example, the periodic signal P is the foregoing data loading signal LD or the clock signal YCLK. For example, the control unit 332 counts a default value according to the periodic signal P. When the control unit 332 counts to the default value, a control signal C4 is immediately outputted to the logic unit 334, which further outputs a second output enabling signal YOE2 according to the control signal C4 and a first output enabling signal YOE1. For example, the logic unit 334 is an AND gate.

Figure 31:
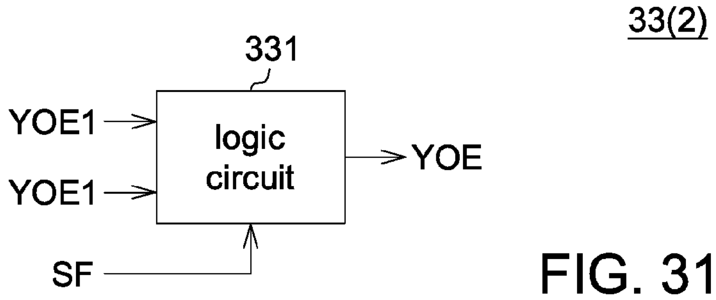
FIG. 31 is a schematic diagram of a second status recognizing unit.

FIG. 31 shows a schematic diagram of a second status recognizing unit. The foregoing status recognizing unit 33 is exemplified by a status recognizing unit 33(2) in FIG. 31. For example, the status recognizing unit 33 is implemented by a logic circuit 331, e.g., a multiplexer. A first output enabling signal YOE1 represents an unmasked original signal, and a second output enabling signal YOE2 represents a DC voltage. For example, the DC voltage is a power voltage or a ground voltage. The logic circuit 330 selectively outputs the first output enabling signal YOE1 or the second output enabling signal YOE2 according to the status feedback signal SF.

Figure 32:
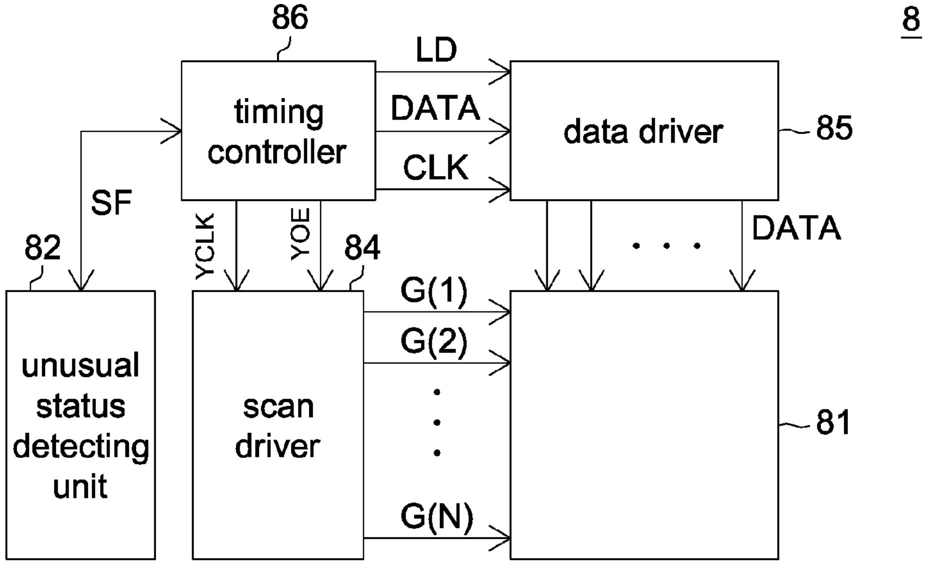
FIG. 32 is a schematic diagram of a timing controller masking a data loading signal and a clock signal according to an unusual status.
Figure 33:
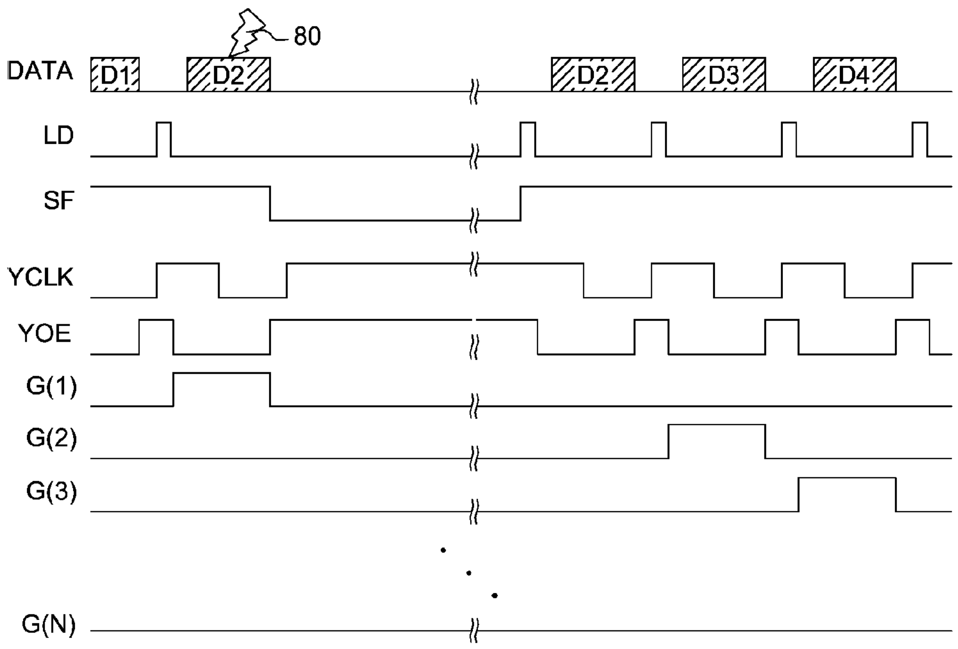
FIG. 33 is a timing diagram of a data loading signal and a clock signal masked by a timing controller according to an unusual status.

FIG. 32 shows is a schematic diagram of a timing controller masking a data loading signal and a clock signal according to an unusual status. FIG. 33 shows a timing diagram of a data loading signal and a clock signal masked by a timing controller according to an unusual status. A display apparatus 8 integrates the foregoing display control circuit 22 to a timing controller 86. The timing controller 86 outputs a clock signal YCLK and an output enabling signal YEO to a scan driver 84 to generate scan signals G(1) to G(N). The timing controller 86 further outputs a clock signal CLK, a data signal DATA and a data loading signal LD to the data driver 85 to drive a panel 81.

In the event of an unusual status, the unusual status detecting unit 82 detects the unusual status to output a status feedback signal SF. According to the status feedback signal, the timing controller 86 masks the data loading signal LD, the clock signal YCLK and the output enabling signal YOE. When the unusual status is eliminated, the timing controller 86 is required to again transmit data at an original location D2 to the data driver 85. More specifically, in the event of an unusual status, all circuits stop operating and only restore to normal operations when the unusual status is eliminated. Before restoring to normal operations, all signals are only transmitted after being synchronized with a vertical synchronization signal Vsync.

Figure 34:
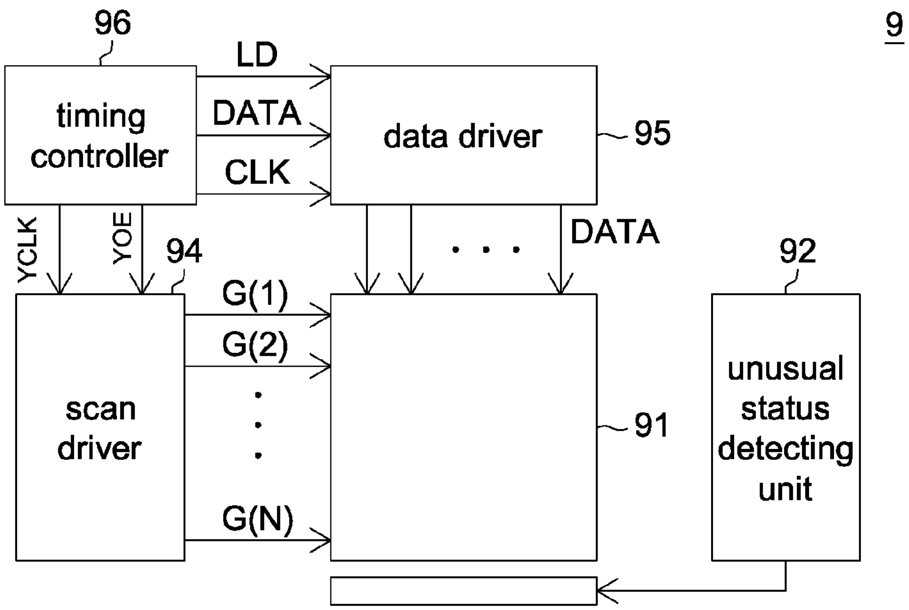
FIG. 34 is a schematic diagram of a backlight module maintaining a backlight brightness according to an unusual status SF.

FIG. 34 shows a schematic diagram of a backlight module maintaining a backlight brightness according to the status feedback signal SF. The display apparatus 9 integrates the foregoing display control circuit 22 to the backlight module 98. A timing controller 96 outputs a clock signal YCLK and an output enabling signal YOE to a scan driver 94 to generate scan signals G(1) to G(N). A timing controller 96 outputs a clock signal CLK, a data signal DATA and a data loading signal LD to a data driver 95 to drive a panel 91.

To prevent an unusual status from interfering the backlight module 98, in the event of an unusual status, an unusual status detecting unit 92 detects the unusual status to output a status feedback signal SF. The backlight module 98 keeps the backlight brightness unchanged according to the feedback signal SF.

Figure 35:
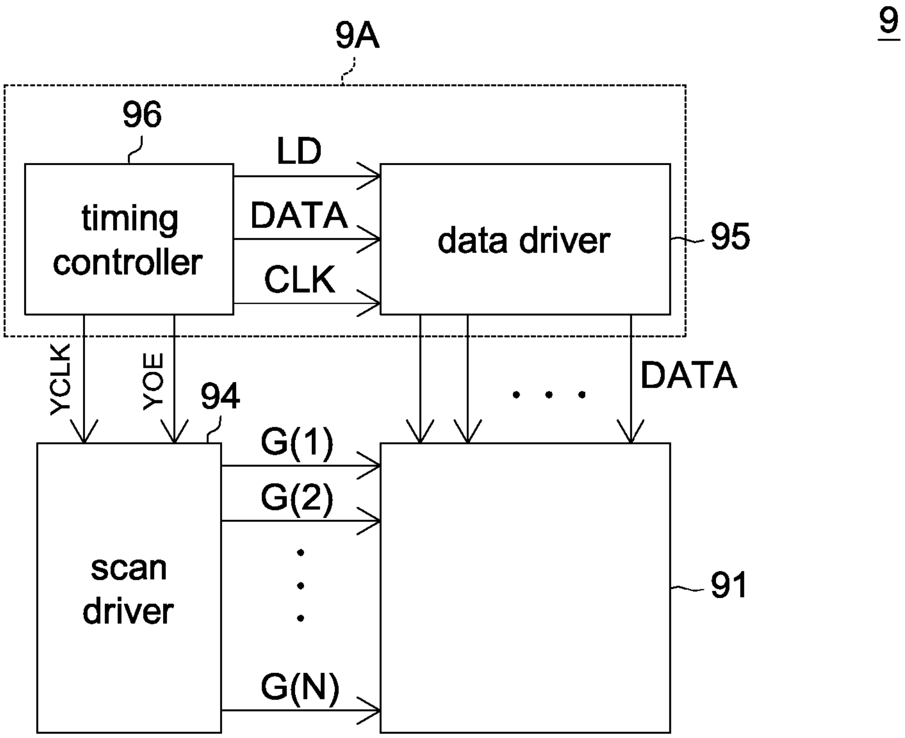
FIG. 35 is a schematic diagram of a data driver and a timing controller integrated into a single-chip.
Figure 36:
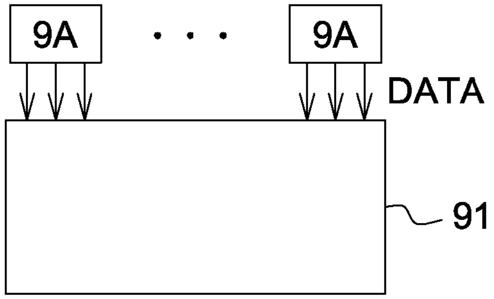
FIG. 36 is a schematic diagram of several single-chips driving a panel.

FIG. 35 shows a schematic diagram of a data driver and a timing controller integrated into a single-chip. FIG. 36 shows a schematic diagram of several single-chips driving a panel. The foregoing data driver 95 and the timing controller 96 may further be integrated to a single-chip 9A. Several single-chips 9A may be cascaded to provide a serially connected output.

Figure 37:
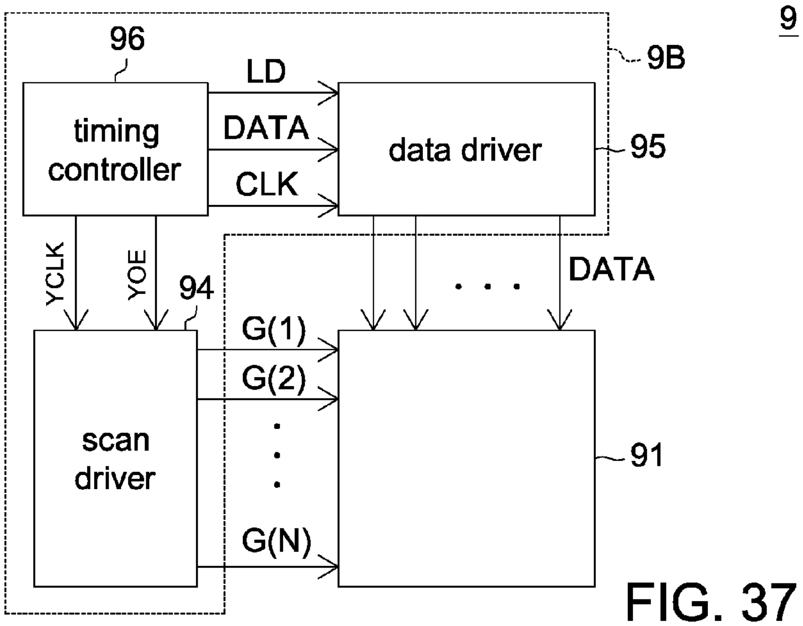
FIG. 37 is a schematic diagram of a scan driver, a data driver and a timing controller integrated into a single-chip.

FIG. 37 shows a schematic diagram of a scan driver, a data driver and a timing controller integrated into a single-chip. The foregoing scan driver 94, the data driver 95 and the timing controller 96 may further be integrated into a single-chip 9B.

Figure 38:
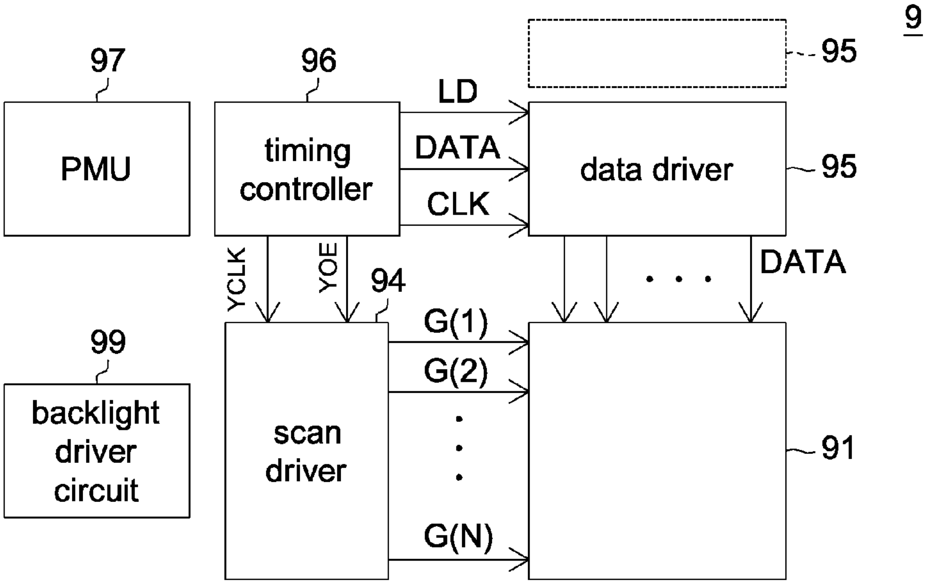
FIG. 38 is a schematic diagram of several of a scan driver, a data driver, a timing controller, a power management module and a backlight driving circuit being selected and integrated into a single-chip.

FIG. 38 shows a schematic diagram of several of a scan driver, a data driver, a timing controller, a power management module and a backlight driving circuit being selected and integrated into a single-chip. Apart from the integrations of the single-chips 9A and 9B, several of the scan driver 94, the data driver 95, the timing controller 96, the power management module 97 and the backlight module 99 are selected and integrated into a single-chip 9C.

Figure 39:
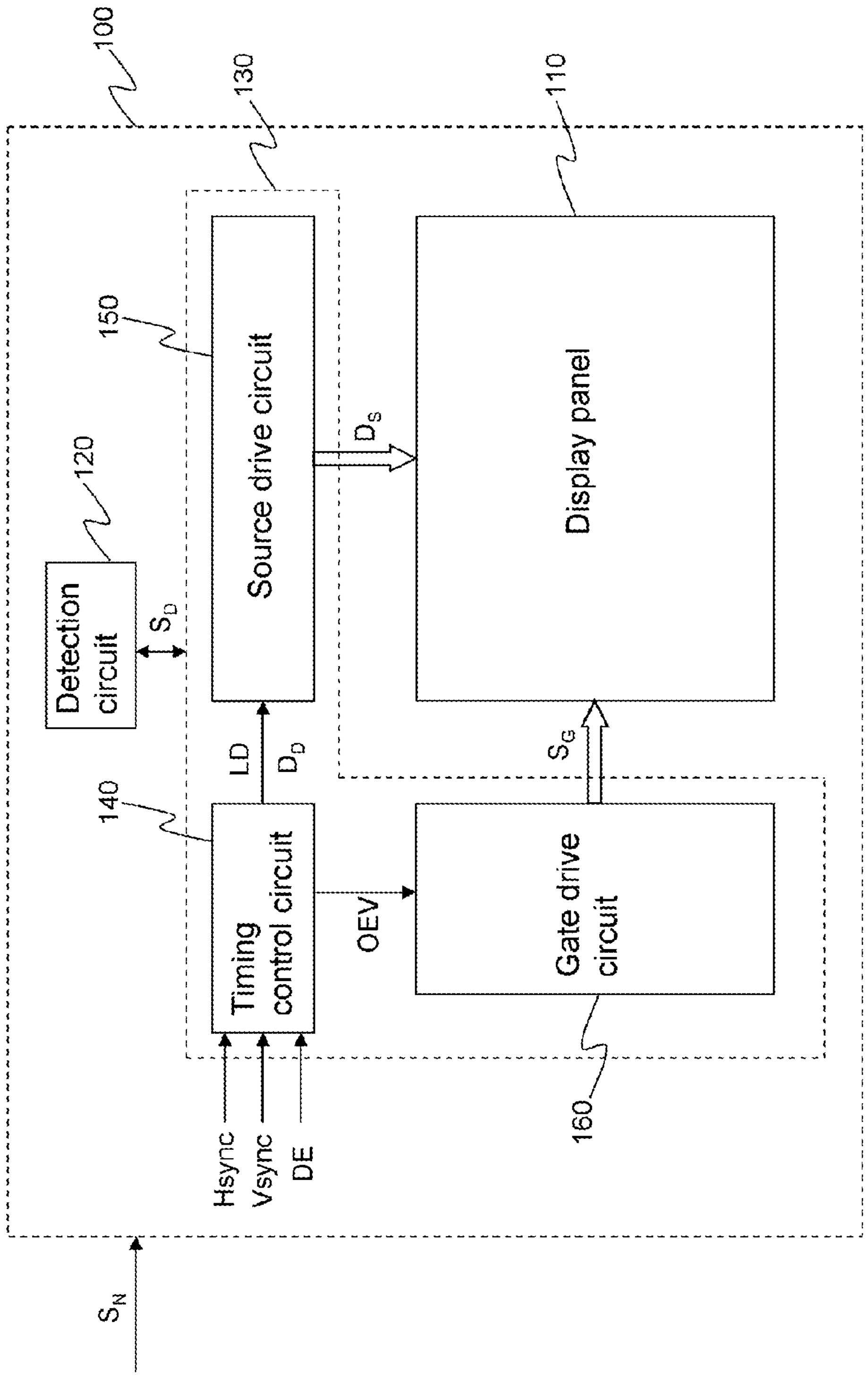
FIG. 39 is a function block diagram of a display apparatus according to an embodiment of the present invention.

Referring to FIG. 39, FIG. 39 is a function block diagram of a display apparatus 100 according to an embodiment of the present invention. The display apparatus 100 includes a display panel 110, a detection circuit 120, and a control circuit 130. The display panel 110 is configured to display images. The detection circuit 120 is configured to detect a noise $S_N$ influencing the display apparatus 100, and generate a detection signal $S_D$ in response to the noise $S_N$ when the noise $S_N$ is detected. The control circuit 130 is coupled to the detection circuit 120 and the display panel 110, and is configured to maintain an image displayed by the display panel 110 according to the detection signal $S_D$ until the noise $S_N$ disappears. In this way, when the display apparatus 100 is influenced by a noise, the display panel 110 can keep displaying an image displayed before the influence.

In an embodiment of the present invention, the noise $S_N$ is an electrostatic noise, and the detection circuit 120 is an ESD circuit and configured to detect the electrostatic noise $S_N$. The ESD circuit 120 generates the detection signal $S_D$ in response to the detected electrostatic noise $S_N$. It should be understood that the noise $S_N$ may be a noise in forms besides the electrostatic noise, and the present invention is not limited thereto. For example, the noise $S_N$ may also be an electromagnetic wave noise or a magnetic field noise.

Figure 40:
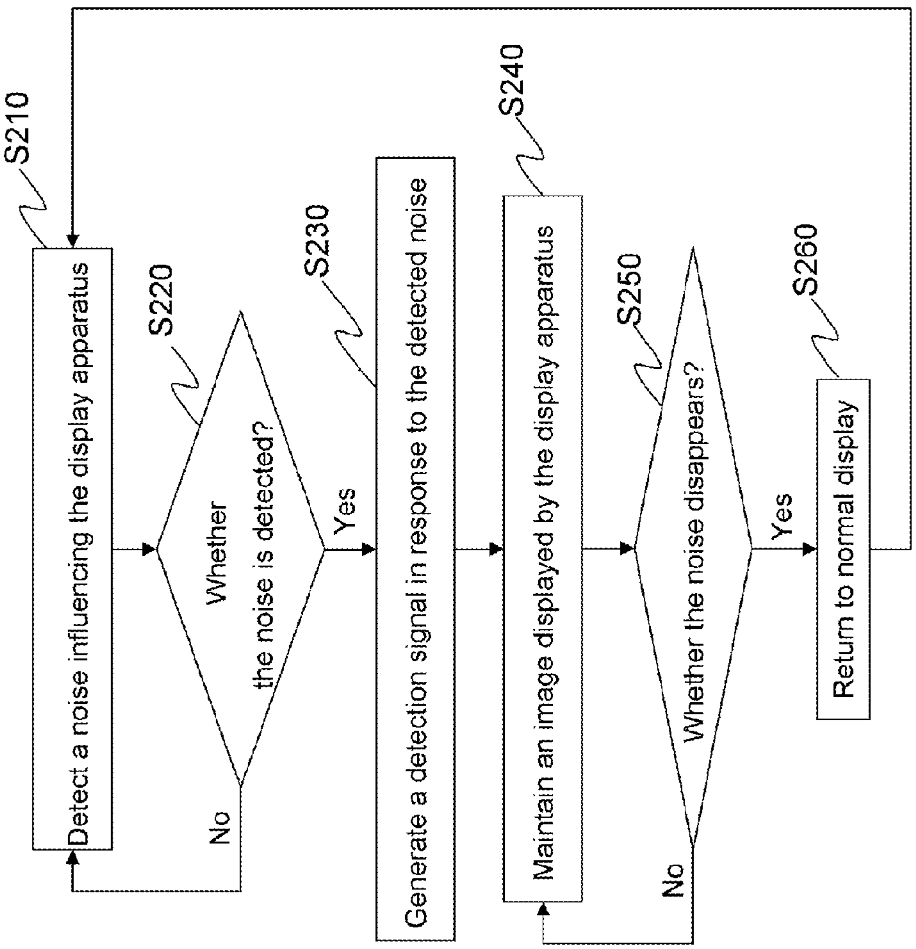
FIG. 40 is a flow chart of a control method of a display apparatus according to an embodiment of the present invention.

Referring to FIG. 40, FIG. 40 is a flow chart of a control method of a display apparatus according to an embodiment of the present invention. In Step S210, the detection circuit 120 detects a noise $S_N$ influencing the display apparatus 100. Then, in Step S220, it is judged whether the noise $S_N$ is detected. If the detection circuit 120 does not detect any noise influencing the display apparatus 100, the procedure proceeds to Step S210, so that the detection circuit 120 continues to detect a noise influencing the display apparatus 100. Otherwise, if the detection circuit 120 detects the noise $S_N$ influencing the display apparatus 100, the procedure proceeds to Step 230, so that a detection signal $S_D$ is generated based on the detected electrostatic noise $S_N$. Then, in Step S240, the control circuit 130 maintains an image displayed by the display panel 110 according to the detection signal $S_D$. Further, in Step S250, the control circuit 130 judges whether the noise $S_N$ disappears according to the detection signal $S_D$ generated by the detection circuit 120. If it is judged in Step S250 that the noise $S_N$ does not disappear, the control circuit 130 continues controlling the display panel 110 to make the display panel 110 maintain the displayed image; otherwise, if it is judged in Step S250 that the noise $S_N$ already disappears, the procedure proceeds to Step S260, the control circuit 130 returns to a normal control mode to make the display panel 110 returns to a normal display mode.

Figure 41:
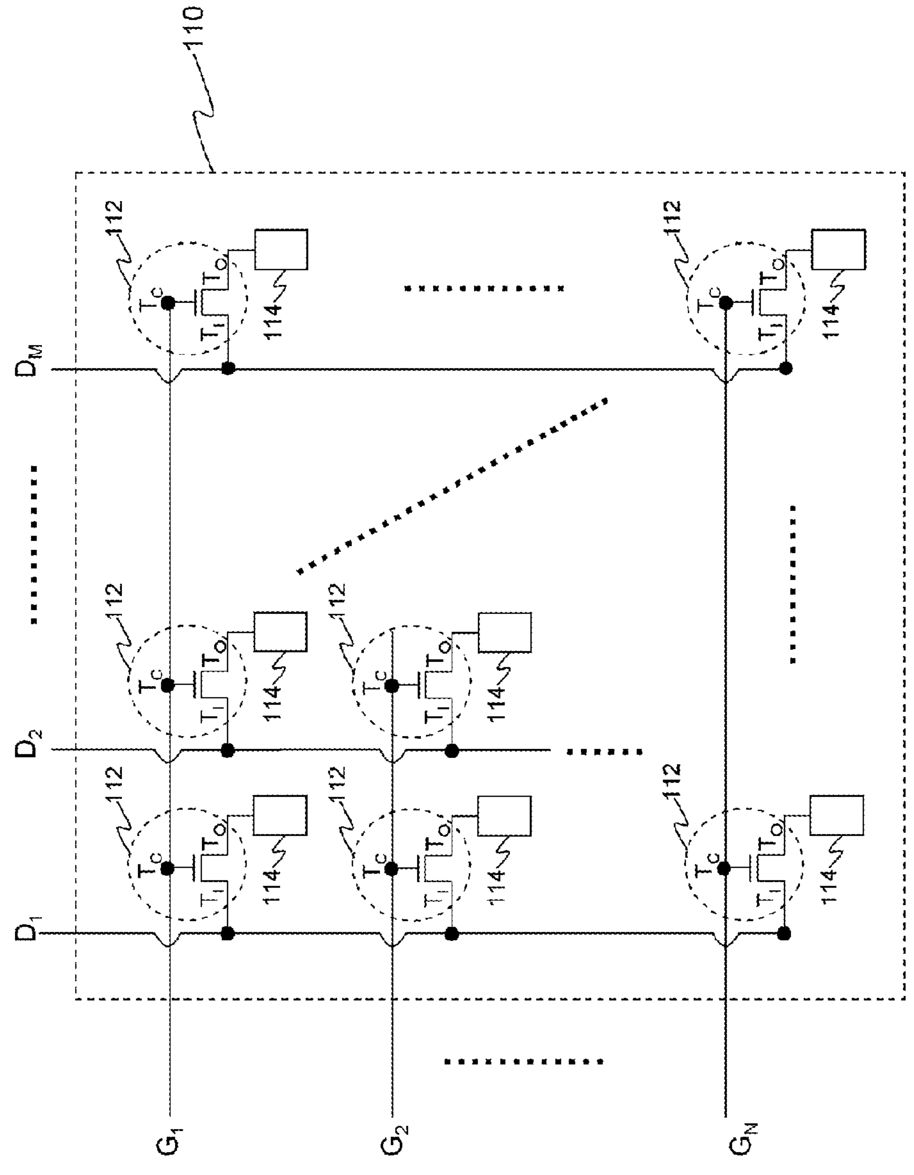
FIG. 41 is a circuit diagram of a display panel of a display apparatus according to an embodiment of the present invention.

Referring to FIG. 41, FIG. 41 is a circuit diagram of a display panel 100 of a display apparatus according to an embodiment of the present invention. The display panel 110 includes a plurality of data lines $D_1$ to $D_M$, a plurality of scan lines $G_1$ to $G_N$, a plurality of control units 112, and a plurality of display units 114. A control terminal $T_C$ of each control unit 112 is coupled to a corresponding scan line, an input terminal $T_I$ of each control unit 112 is coupled to a corresponding data line, and an output terminal $T_o$ of each control unit 112 is coupled to a corresponding display unit 114. In an embodiment of the present invention, the display panel 110 is a Liquid Crystal Display (LCD) panel, the control unit 112 is Thin-Film Transistor (TFT), and the display unit 114 is a pixel having liquid crystal molecules. The control terminal $T_C$ of the control unit 112 is a gate. The input terminal $T_I$ of the control unit 112 is a source. The output terminal $T_o$ of the control unit 112 is a drain.

It should be understood that, although an LCD is taken as an example of the display apparatus in the aforementioned embodiments, the present invention may also be applied in other display apparatuses, such as a plasma display and a Cathode Ray Tube (CRT) monitor.

Referring to FIG. 39, in an embodiment of the present invention, the control circuit 130 includes a timing control circuit 140, a source drive circuit 150, and a gate drive circuit 160. The timing control circuit 140 is configured to generate a source control signal LD and a gate control signal OEV. The source drive circuit 150 is coupled to the timing control circuit 140 and the display panel 110. The gate drive circuit 160 is coupled to the timing control circuit 140 and the display panel 110. Referring to FIG. 39 and FIG. 41, when the display apparatus 100 operates in the normal display mode, the source drive circuit 150 receives a video signal $D_D$ according to the source control signal LD generated by a timing control circuit 140, and converts the video signal $D_D$ into display signals D. The source drive circuit 150 outputs the display signals $D_S$ to the input terminals $T_I$ of the control units 112 through the data lines $D_1$ to $D_M$. Further, the gate drive circuit 160 outputs a scan signal $S_G$ to the control terminals $T_C$ of the control units 112 in sequence through the scan lines $G_1$ to $G_N$ according to the gate control signal OEV generated by the timing control circuit 140. When the scan signal $S_G$ is of high potential, the control unit 112 is turned on, so that the display unit 114 receives the display signal $D_S$ from the source drive circuit 150, and presents a corresponding display state in response to the received display signal $D_S$. It should be understood that, although the display signals received by the display units 114 are represented by the same symbol, namely Ds, the display signals $D_S$ received by the display units 114 may be different from one another, so that different display states may be presented. Further, when the detection circuit 120 detects the noise $S_N$, the source drive circuit 150 temporarily stops outputting the display signals $D_S$ to the input terminals $T_I$ of the control units 112, and the gate drive circuit 160 temporarily stops outputting the scan signal $S_G$ to the control terminals $T_C$ of the control units 112. In this way, the display panel 110 can keep displaying an image displayed before the influence. Further, in an embodiment of the present invention, when the detection circuit 120 detects the noise $S_N$, the source drive circuit 150 temporarily stops receiving the video signal $D_D$.

In an embodiment of the present invention, the display apparatus 100 performs an operation thereof according to a plurality of control signals. For example, the plurality of control signals includes a horizontal synchronization signal Hsync, a vertical synchronization signal Vsync, and a data enable signal DE. The control signals are consistent with corresponding specific formats respectively, so that the display apparatus 100 can operate accordingly. The detection circuit 120 detects whether waveforms of the control signals are consistent with the corresponding specific formats thereof. If the waveform of any control signal is not consistent with the corresponding specific format, the detection circuit 120 judges that the display apparatus 100 is influenced by a noise, and therefore generates the detection signal $S_D$.

Figure 42:
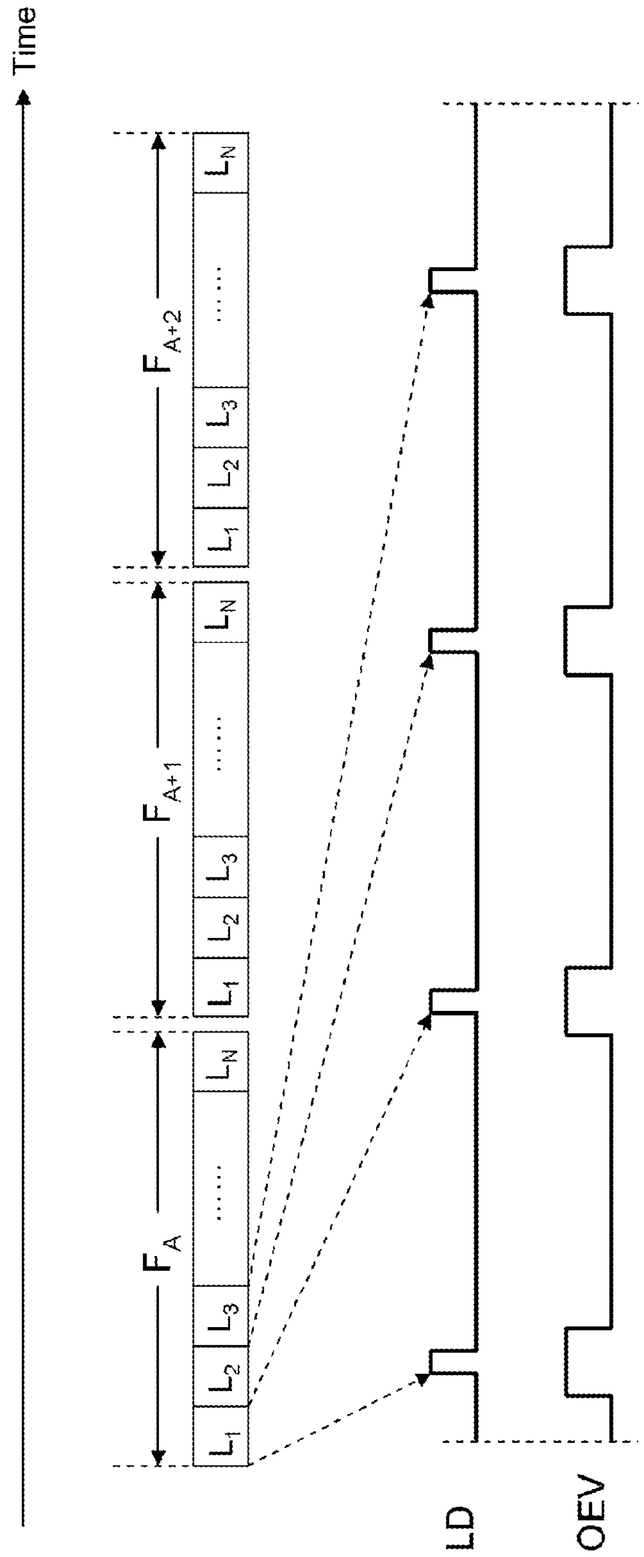
FIG. 42 is a timing diagram of a source control signal and a gate control signal when a display apparatus is not influenced by any noise according to an embodiment of the present invention.

Referring to FIG. 39, FIG. 41, and FIG. 42, FIG. 42 is a timing diagram of the source control signal LD and the gate control signal OEV when the display apparatus 100 is not influenced by the noise $S_N$ according to an embodiment of the present invention. When the source control signal LD is of high potential, the source drive circuit 150 receives the video signal $D_D$, and converts the video signal $D_D$ into display signals D. When the gate control signal OEV is of low potential, the gate drive circuit 160 sends the scan signal $S_G$ to the control terminals $T_C$ of the control units 112 through the scan lines $G_1$ to $G_N$, so as to turn on the control units 112. Correspondingly, when the source control signal LD is of low potential, the source drive circuit 150 temporarily stops receiving the video signal $D_D$, and stops converting the video signal $D_D$ into the display signals $D_S$. When the gate control signal OEV is of high potential, the gate drive circuit 160 stops sending the scan signal $S_G$ to the control terminals $T_C$ of the control units 112.

When the display apparatus 100 operates, the timing is divided into a plurality of image frame cycles, and in each image frame cycle the display states of the display units 114 are updated once. FIG. 42 shows three image frame cycles $F_A$ to $F_{A+2}$. Further, each of the image frame cycles $F_A$ to $F_{A+2}$ is divided into a plurality of scan cycles $L_1$ to $L_N$. In the scan cycles $L_1$ to $L_N$, the gate drive circuit 160 transmits the scan signal $S_G$ to corresponding scan lines $G_1$ to $G_N$, so as to update the display states of the display units 114 connected to the scan lines. For example, in the scan cycle $L_1$, the display state of the display unit 114 connected to the scan line $G_1$ is updated; in the scan cycle $L_2$, the display state of the display unit 114 connected to the scan line $G_2$ is updated; in the scan cycle $L_N$, the display state of the display unit 114 connected to the scan line $G_N$ is updated, and so on.

Figure 43:
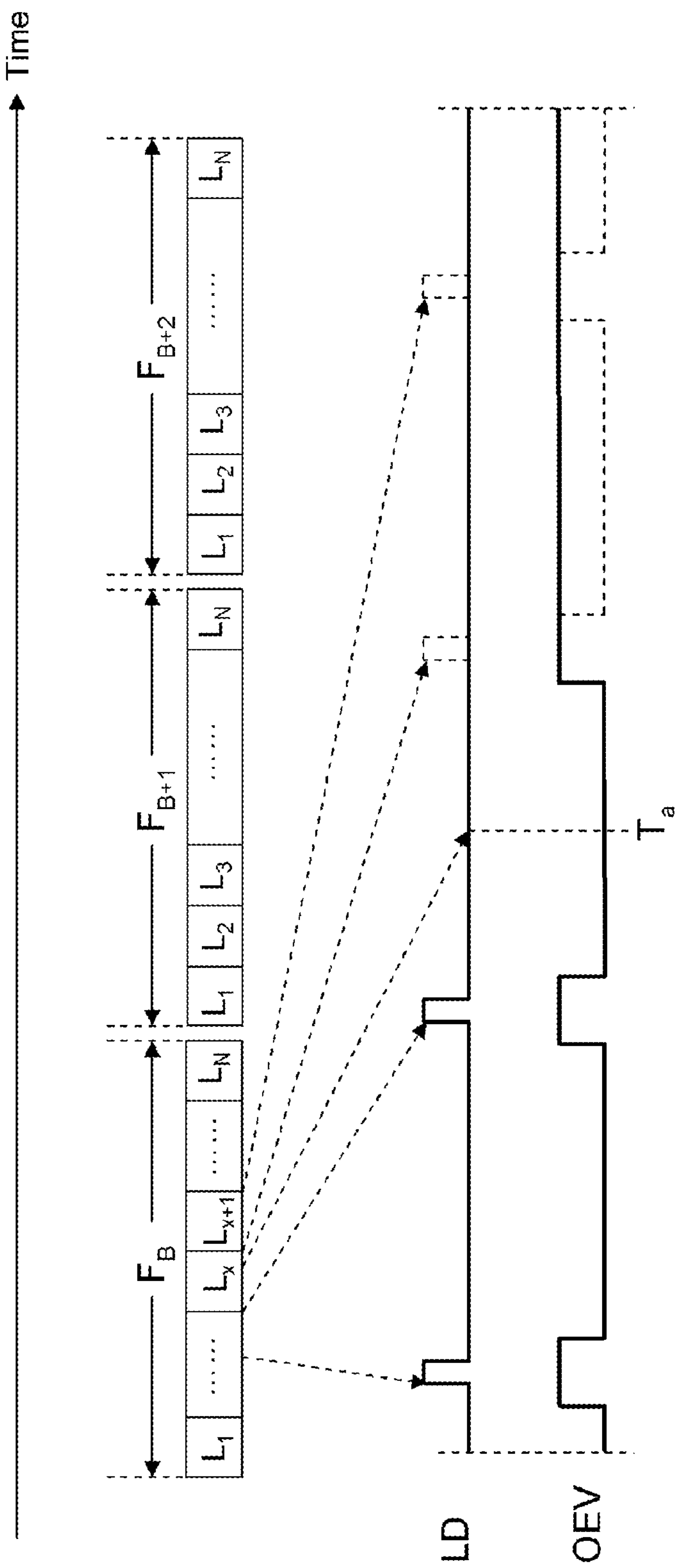
FIG. 43 is a timing diagram of a source control signal and a gate control signal when a display apparatus is influenced by a noise according to an embodiment of the present invention.

Referring to FIG. 39, FIG. 41, and FIG. 43, FIG. 43 is a timing diagram of the source control signal LD and the gate control signal OEV when the display apparatus 100 is influenced by the noise $S_N$ according to an embodiment of the present invention. FIG. 43 shows three other image frame cycles $F_B$ to $F_{B+2}$. At a time point $T_a$ within a scan cycle $L_X$, the detection circuit 120 detects the noise $S_N$ influencing the display apparatus 100, and therefore generates the detection signal $S_D$. The timing control circuit 140 receives the detection signal $S_D$, therefore makes the source control signal LD maintain low potential after the scan cycle $L_X$, and makes the gate control signal OEV maintain high potential in scan cycles after the scan cycle $L_X$. In this way, after the scan cycle $L_X$, updating of the display states of all of the display units 114 is stopped, so as to make the display panel 110 maintain the image displayed before the influence.

Figure 44:
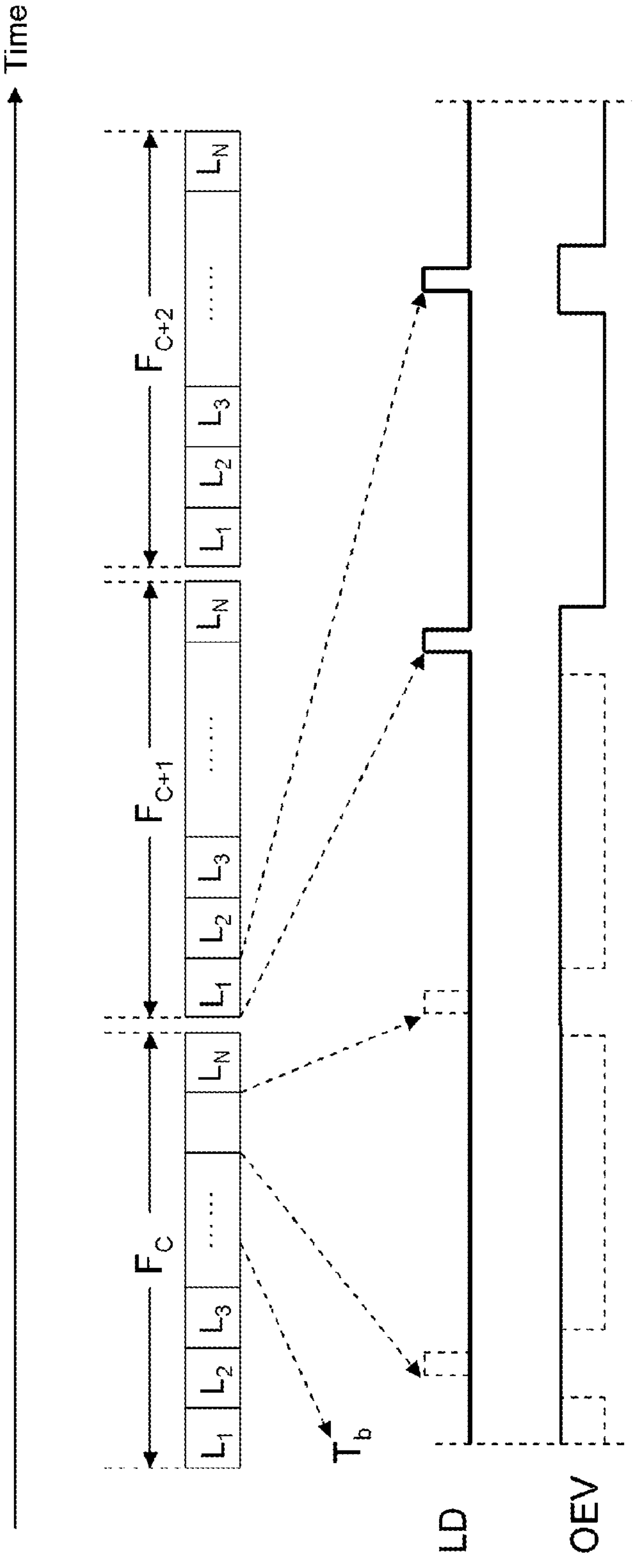
FIG. 44 is a timing diagram of a source control signal and a gate control signal when a noise influencing a display apparatus disappears according to an embodiment of the present invention.

Referring to FIG. 39, FIG. 41, and FIG. 44, FIG. 44 is a timing diagram of the source control signal LD and the gate control signal OEV when the noise influencing the display apparatus 100 disappears according to an embodiment of the present invention. FIG. 44 shows three other image frame cycles $F_C$ to $F_{C+2}$. Before the image frame cycle $F_C$, the display apparatus 100 is influenced by the noise $S_N$, but at a time point $T_b$ within the scan cycle $L_C$, the detection circuit 120 detects that the noise $S_N$ influencing the display apparatus 100 disappears. In scan cycles after the time point $T_b$ and within the image frame cycle $F_C$, the source control signal LD maintains low potential, and the gate control signal OEV maintains high potential. Then, after the noise $S_N$ disappears, in the first scan cycle $L_1$ in the image frame cycle $F_{C+1}$, the control circuit 130 returns to the normal control mode, so as to raise the potential of the source control signal LD to the high potential and lower the potential of the gate control signal OEV to the low potential. Therefore, in the first scan cycle $L_1$ in the first image frame cycle (the image frame cycle $F_{C+1}$) after the noise $S_N$ disappears, the source drive circuit 150 continues to receive the video signal $D_D$, and converts the video signal $D_D$ into the display signals $D_S$, and the gate drive circuit 160 continues to output the scan signal $S_G$ to the control terminals $T_C$ of the control units 112. In this way, after the image frame cycle $F_{C+1}$, the control circuit 130 continues to update the display states of the display units 114, so as to update the image displayed by the display panel 110. The control circuit 130 returns to the normal control mode in the first scan cycle in the first image frame cycle after the noise $S_N$ disappears, so that after returning to the normal display mode the display panel 110 can display normal and complete images.

In view of the above, the display apparatus of the present invention detects whether the display apparatus is influenced by a noise through the detection circuit thereof. When the display apparatus is influenced by the noise, an image which is displayed before the display apparatus is influenced by the noise is maintained until the noise disappears. In this way, a user is prevented from viewing abnormally displayed images.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frame maintaining circuit applied to a display apparatus, comprising:

a detection circuit, for detecting an unusual status to output a status feedback signal, comprising:

a latch;

a switch, coupled to the latch;

a comparator, for providing a reset signal to the latch; and a switch control circuit, coupled to the switch, for controlling the switch to write a ground voltage to the latch to output the status feedback signal in an occurrence of the unusual status; and a display control circuit, for maintaining a frame displayed by the display apparatus according to the status feedback signal until the unusual status ceases.

2. The frame maintaining circuit according to claim 1, wherein the display apparatus comprises a backlight module, and the display control circuit controls a backlight brightness generated by the backlight module to be same as the backlight brightness before an occurrence of the unusual status according to the status feedback signal.

3. The frame maintaining circuit according to claim 1, wherein the display apparatus comprises a power management unit, and the display control circuit controls a common voltage generated by the power management unit to be same as the common voltage before an occurrence of the unusual status according to the status feedback signal.

4. The frame maintaining circuit according to claim 1, wherein the display apparatus comprises a scan driver, the scan driver outputs a plurality of scan signals, and the display control circuit controls the scan driver to stop outputting the scan signals according to the status feedback signal.

5. The frame maintaining circuit according to claim 1, wherein the display apparatus comprises a data driver, the data driver outputs a plurality of data signals, and the display control circuit controls the data driver to stop outputting the data signals according to the status feedback signal.

6. The frame maintaining circuit according to claim 1, wherein the display apparatus comprises a timing controller and a scan driver, the scan driver outputs a plurality of scan signals, and the display control circuit controls the timing controller to change a first output enabling signal to a second output enabling signal according to the status feedback signal to mask the corresponding scan signal.

7. The frame maintaining circuit according to claim 1, wherein the display apparatus comprises a timing controller, a data driver and a scan driver, and the display control circuit controls the timing controller to mask or stop outputting signals to the data driver and the scan driver according to the status feedback signal.

8. The frame maintaining circuit according to claim 7, wherein after the unusual status is eliminated, the display control circuit controls the timing controller to first synchronize the signals to be outputted to the data driver and the scan driver and then output the synchronized signals to the data driver and the scan driver.

9. The frame maintaining circuit according to claim 1, wherein the switch control circuit comprises:

a charging circuit, for providing a charging voltage according to the ground voltage and a supply voltage, the supply voltage being greater than the ground voltage; and a phase inverter, for outputting an inversed signal to a control terminal of the switch according to the charging voltage.

10. The frame maintaining circuit according to claim 9, wherein the comparator outputs the reset signal according to the charging voltage and the supply voltage.

11. The frame maintaining circuit according to claim 9, wherein the charging circuit comprises:

a resistor, having a first terminal for receiving the supply voltage; and a capacitor, having a first terminal coupled to a second terminal of the resistor; and the phase inverter has an input terminal coupled to the first terminal of the capacitor and the second terminal of the resistor, and an output terminal coupled to the control terminal of the switch.

12. The frame maintaining circuit according to claim 9, wherein the reset signal is at a high potential when a difference between the supply voltage and the charging voltage is smaller than a threshold, and is at a low potential when the difference between the supply voltage and the charging voltage is not smaller than the threshold.

13. The frame maintaining circuit according to claim 1, wherein the detection circuit comprises:

a voltage-dividing circuit, for generating a first divided voltage and a second divided voltage according to the ground voltage and a supply voltage; and a Schmitt trigger, for outputting the status feedback signal when a difference between the first divided voltage and the second divided voltage is greater than a threshold voltage.

14. The frame maintaining circuit according to claim 13, wherein the voltage-dividing circuit comprises:

a first resistor;

a second resistor, coupled to the first resistor in series, for providing the first divided voltage;

a capacitor;

a third resistor; and a fourth resistor, coupled to the capacitor in parallel and coupled to the third resistor in series to provide the second divided voltage.

* * * * *